(12) United States Patent
Muramatsu

(10) Patent No.: US 8,564,829 B2
(45) Date of Patent: Oct. 22, 2013

(54) IMAGE PROCESSING APPARATUS, METHOD, AND COMPUTER-READABLE MEDIUM FOR CONVERTING FRAMES OF IMAGE DATA TO HIGHER RESOLUTION IMAGE DATA

(75) Inventor: Mizuki Muramatsu, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 628 days.

(21) Appl. No.: 12/808,636

(22) PCT Filed: Dec. 19, 2008

(86) PCT No.: PCT/JP2008/073886
§ 371 (c)(1),
(2), (4) Date: Jun. 16, 2010

(87) PCT Pub. No.: WO2009/082015
PCT Pub. Date: Jul. 2, 2009

(65) Prior Publication Data
US 2011/0116112 A1    May 19, 2011

(30) Foreign Application Priority Data

Dec. 21, 2007   (JP) .................................. 2007-330976
Dec. 12, 2008   (JP) .................................. 2008-317281

(51) Int. Cl.
*G06F 15/00* (2006.01)
(52) U.S. Cl.
USPC ............ 358/1.9; 382/300; 382/299; 382/298; 382/276; 348/208.13; 348/208.12
(58) Field of Classification Search
None
See application file for complete search history.

(56) References Cited

U.S. PATENT DOCUMENTS 7,961,985 B2 *   6/2011   Aiso .............................. 382/299

FOREIGN PATENT DOCUMENTS

| JP | H07-193690 A | 7/1995 |
| JP | H09-018674 A | 1/1997 |
| JP | 2002-320084 A | 10/2002 |
| JP | WO2005/046221 A1 | 5/2005 |
| JP | 2006-092450 A | 4/2006 |

OTHER PUBLICATIONS

Kamo et al., Image Reader, JP9018674, Jan. 17, 1997, machine translation of Japanese Patent Publication.*
Aoki, Shin, "Super-resolution processing With Multiple Digital Image Data", Ricoh Technical Report No. 24, Nov. 1998, pp. 19-25.

* cited by examiner

*Primary Examiner* — Paul F Payer
(74) *Attorney, Agent, or Firm* — Carter, DeLuca, Farrell & Schmidt LLP

(57) ABSTRACT

An image processing apparatus characterized by including; an area sensor unit that reads from an original document image a plurality of frames of image data having a shift of less than one pixel, an output resolution acquisition unit that obtains an output image resolution at which resolution the original document image read by the area sensor unit is output, an acquisition frame number control unit that controls a number of frames read by the area sensor unit according to a result of the output resolution acquisition unit, a correction unit that corrects an inclination of the frames of image data controlled by the acquisition frame number control unit, and a high resolution conversion unit that performs an interpolation processing using the plurality of frames of image data whose inclination is corrected by the correction unit to obtain image data in a resolution higher than a resolution during reading.

5 Claims, 24 Drawing Sheets

FIG. 14
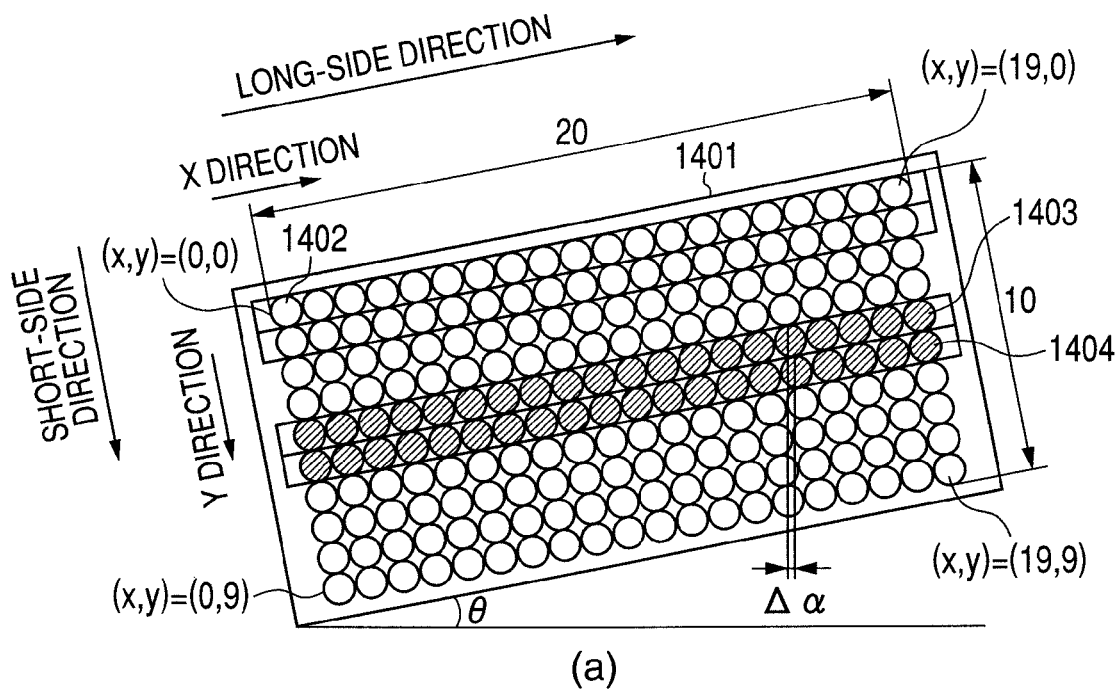
(a)
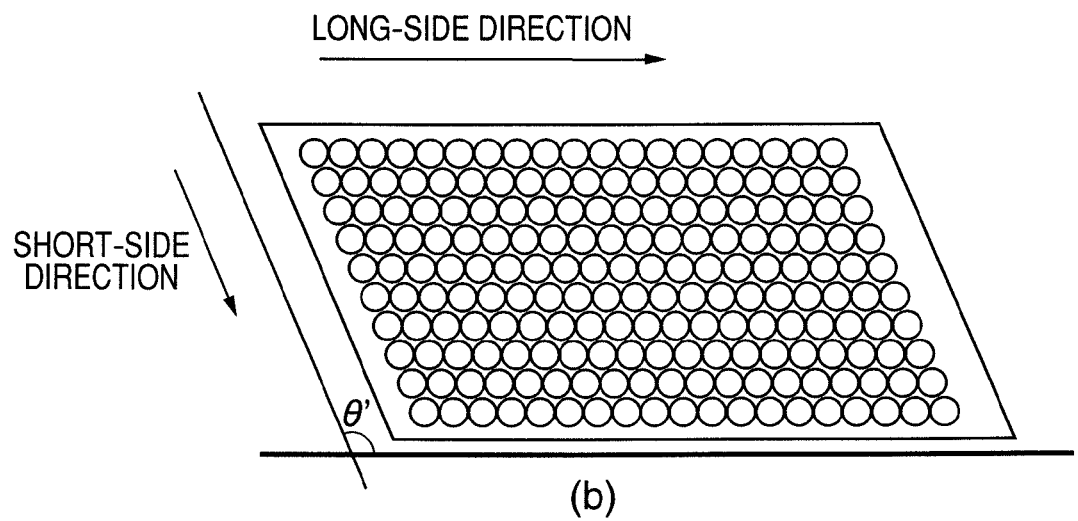
(b)

◇ PIXEL IN TARGET LOW-RESOLUTION IMAGE

● TARGET PIXEL FOR SUPER-RESOLUTION PROCESSING

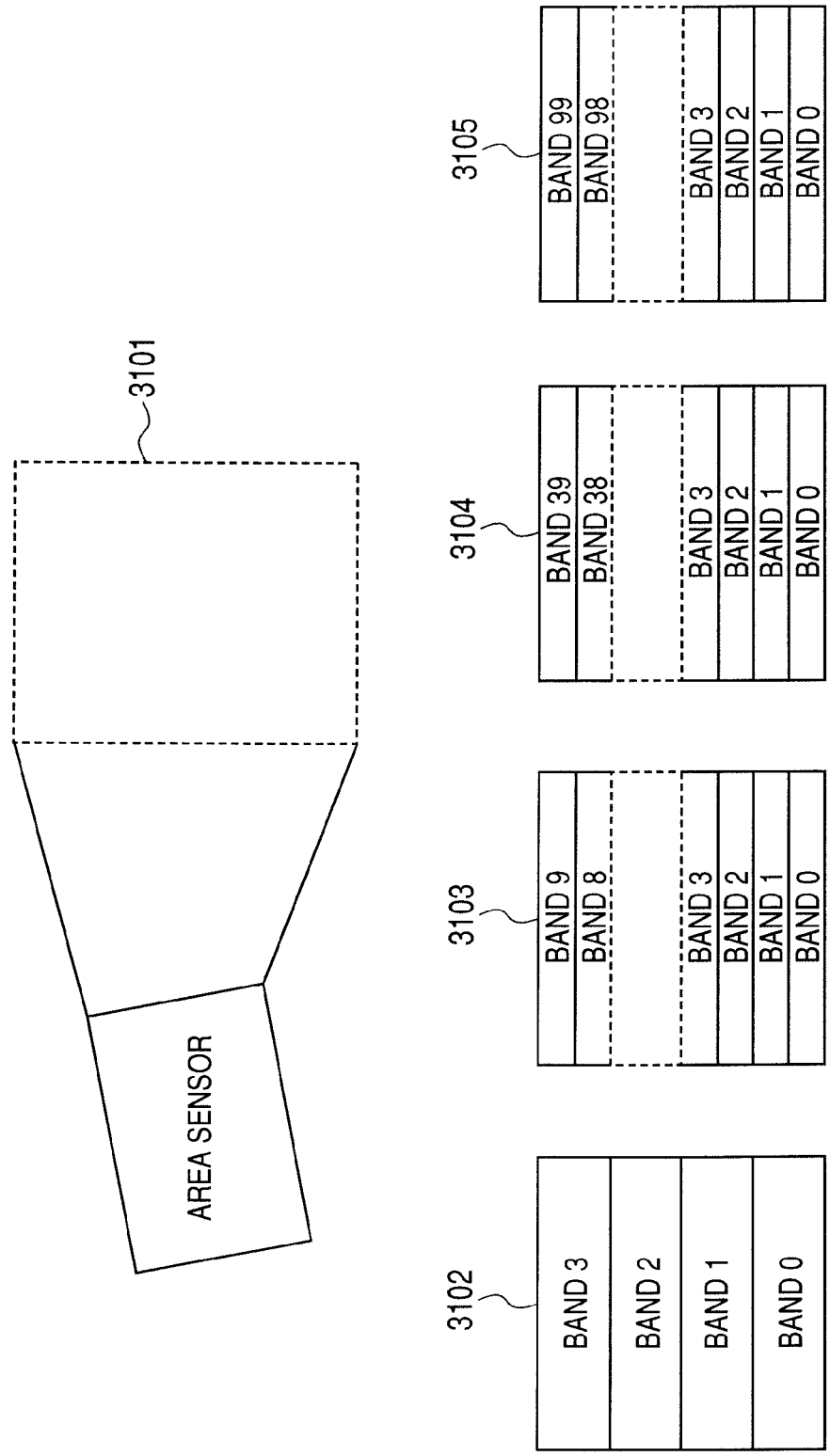

IMAGE PROCESSING APPARATUS, METHOD, AND COMPUTER-READABLE MEDIUM FOR CONVERTING FRAMES OF IMAGE DATA TO HIGHER RESOLUTION IMAGE DATA

TECHNICAL FIELD

The present invention relates to an image processing apparatus, a control method for the image processing apparatus, and a program and a memory medium for executing the image processing method.

BACKGROUND ART

There exits a technology called "super-resolution processing/super-resolution conversion" that improves a resolution by using multiple frames of image data in a certain resolution.

The use of this technology enables conversion from a low resolution image to a high resolution image, and the high resolution image can be obtained with the same device as a conventional one ("Super-resolution processing With Multiple Digital Image Data" (Ricoh Technical Report No. 24, NOVEMBER, 1998)).

The super-resolution technology is widely applied in fields such as motion picture because multiple frames of image data having minutely different reading positions of an original document image in terms of subpixels (a unit smaller than one pixel) of the original document image are necessary to perform the super-resolution technology.

However, to perform the super-resolution processing, there exists a problem that the amount of data and the amount of calculations become large because the multiple frames of image data are necessary to generate one pixel of a high resolution image.

To this end, the amount of calculations has conventionally been reduced by determining the number of frames subjected to the super-resolution processing according to the size of an image area of interest (Japanese Patent Application Laid-Open No. 2006-092450).

However, in the conventional technology as described above, the number of images subjected to the super-resolution processing is determined only in the area of interest. Thus, it is necessary to previously ensure, in the entire image area, the number of frame image data needed for the super-resolution processing.

In a case where the super-resolution processing is used for a multifunction apparatus, or an MFP (Multifunction Peripheral), namely, image processing apparatuses, a line sensor is generally used in a reader in the multifunction apparatus, a scanner, and the like.

That is, the number of read frames obtained through one reading operation is one frame.

The above-described reader reads an original document image using a group of pixel sensors arranged horizontally spaced apart by a distance of integral multiples of a pixel in a primary scan direction. At this position being read, it is impossible to read the original document image with a minute (subpixel) shift in the primary scan direction.

To this end, an area sensor is inclinedly arranged in the apparatus, so that one reading operation allows obtaining image data with the minute shift in the primary scan direction and/or a secondary scan direction at the position of the pixels being read.

However, at this occasion, multiple frames of low resolution frame image data having been read are used regardless of output conditions of the image data.

Thus, there exists a problem that the amount of data and the amount of calculations increase because the low resolution frame image data are memorized more than necessary and that the super-resolution processing is performed using them.

DISCLOSURE OF THE INVENTION

The present invention is made in consideration of the above-described problems, and it is the object of the present invention to provide an image processing apparatus and an image processing method for the image processing apparatus that enable reducing the amount of data and the amount of calculations in an MFP system using the super-resolution processing.

To achieve the above-described object, the image processing apparatus according to the present invention has:

an area sensor unit that reads from an original document image a plurality of frames of image data having a shift of less than one pixel;

an output resolution acquisition unit that obtains an output image resolution at which resolution the original document image read by the area sensor unit is output;

an acquisition frame number control unit that controls a number of frames read by the area sensor unit according to a result of the output resolution acquisition unit;

a correction unit that corrects an inclination of the frames of image data controlled by the acquisition frame number control unit; and a high resolution conversion unit that performs an interpolation processing using the plurality of frames of image data whose inclination is corrected by the correction unit to obtain image data in a resolution higher than a resolution during reading.

According to the present invention, an amount of low resolution image data needed for the super-resolution processing can be obtained according to conditions in which the image is output. Thus, the amount of data and the amount of calculations can be reduced.

Further features of the present invention will become apparent from the following description of exemplary embodiments with reference to the attached drawings.

Figure 9:
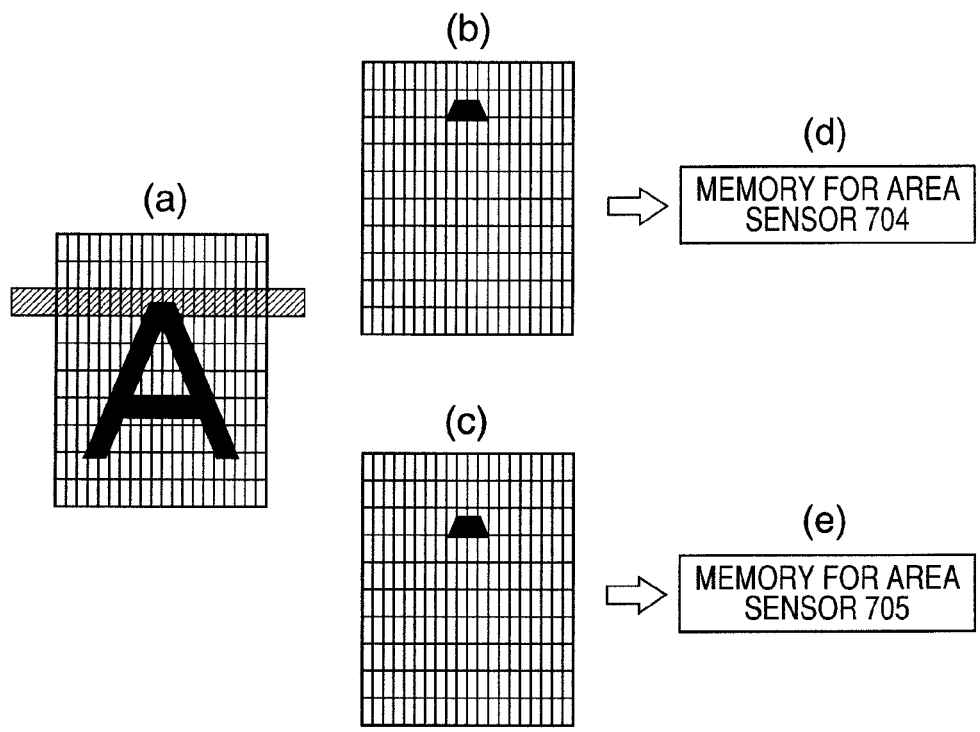

(a), (b), (c), (d) and (e) of FIG. 9 are figures showing a method for obtaining line image data.

Figure 10:
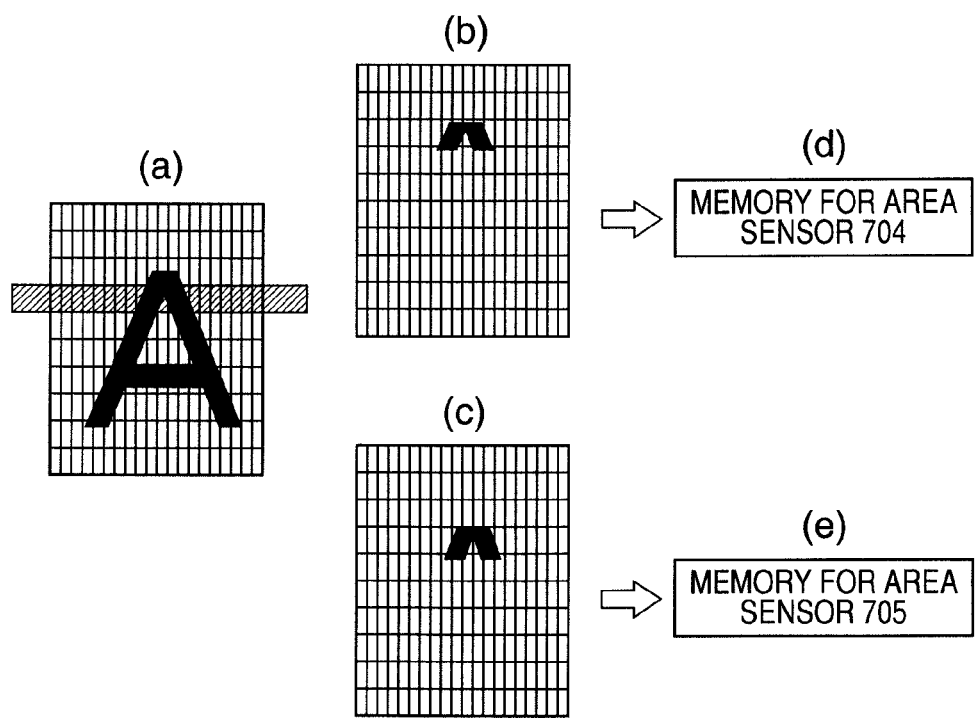

(a), (b), (c), (d) and (e) of FIG. 10 are figures showing the method for obtaining the line image data.

Figure 11:
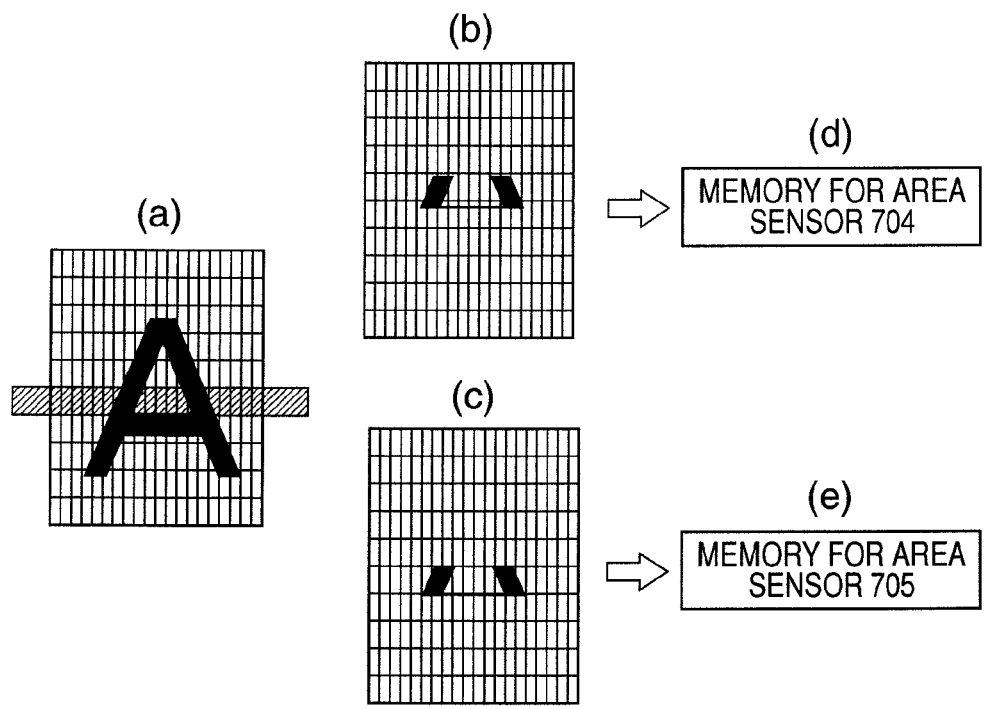

(a), (b), (c), (d) and (e) of FIG. 11 are figures showing the method for obtaining the line image data.

Figure 12:
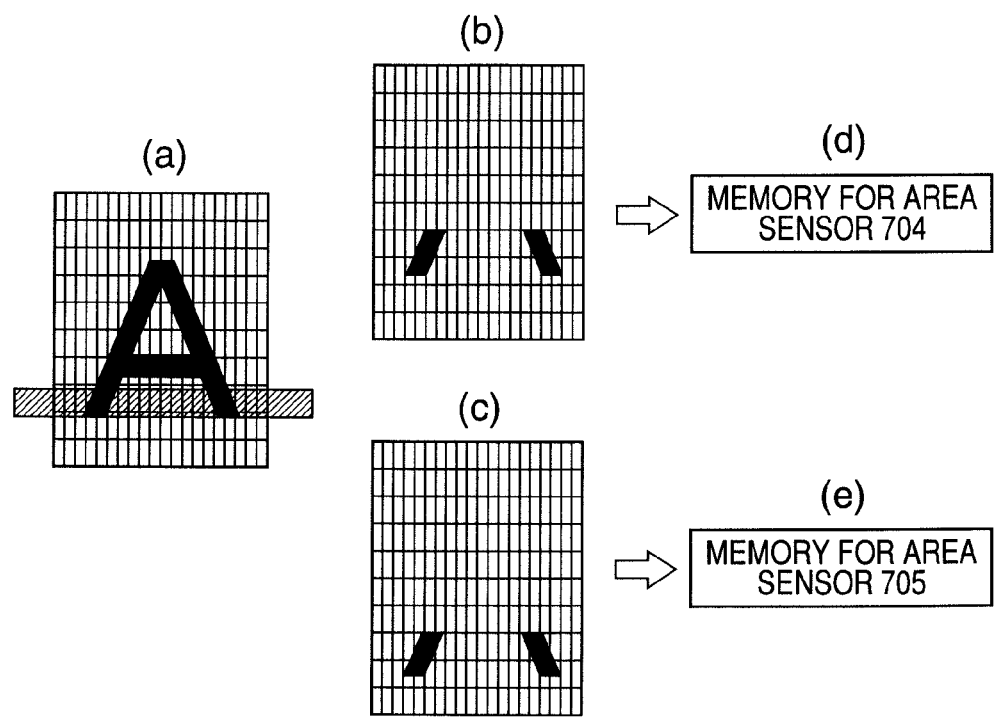

(a), (b), (c), (d) and (e) of FIG. 12 are figures showing the method for obtaining the line image data.

Figure 13:
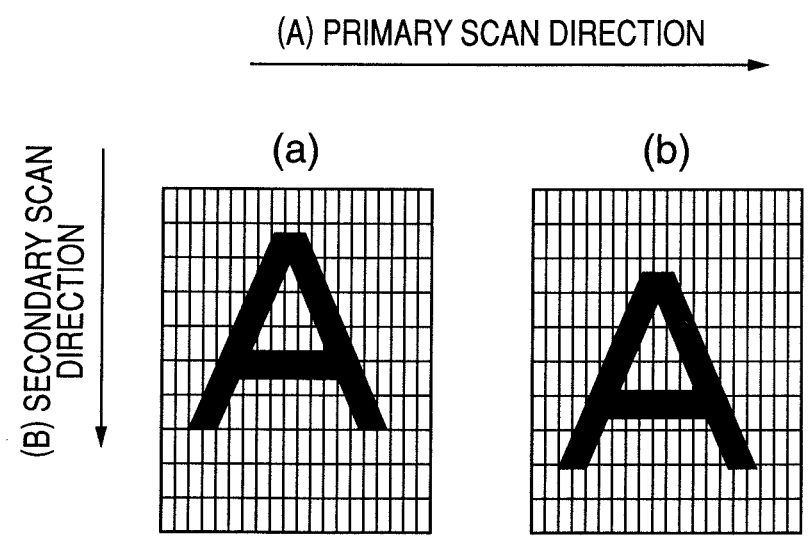

(a) and (b) of FIG. 13 are image data read with the line sensor in the area sensor.

(a) and (b) of FIG. 14 are configuration diagrams in a case where the area sensor is obliquely mounted.

Figure 15:
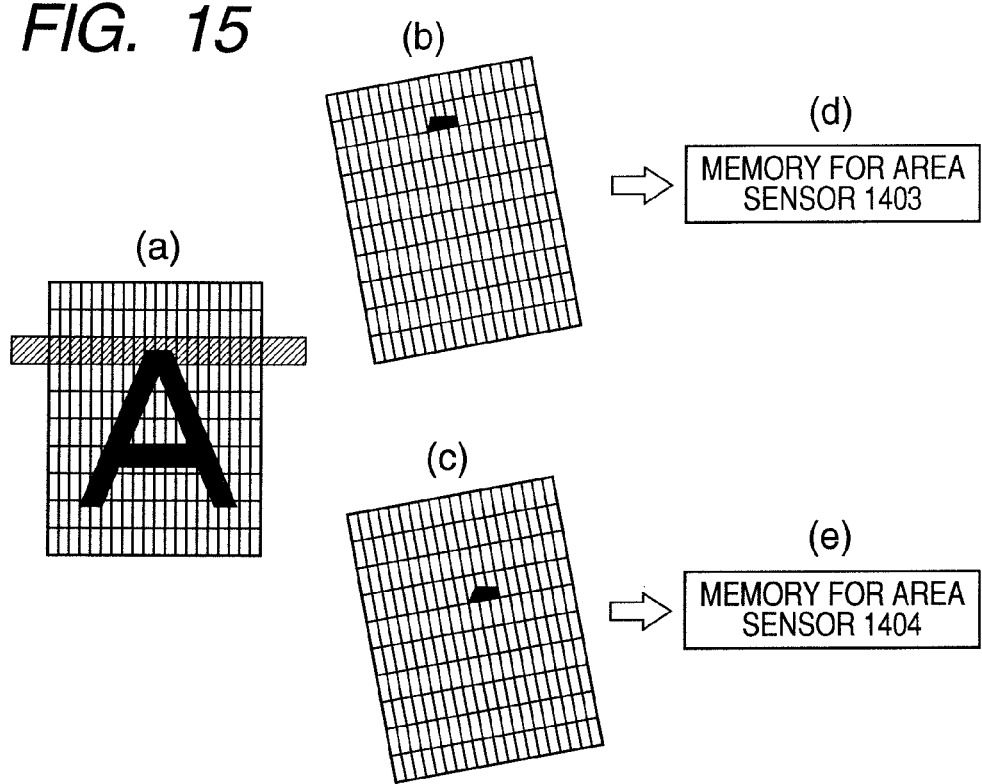

(a), (b), (c), (d) and (e) of FIG. 15 are figures showing a method for obtaining the line image data with the inclined area sensor.

Figure 16:
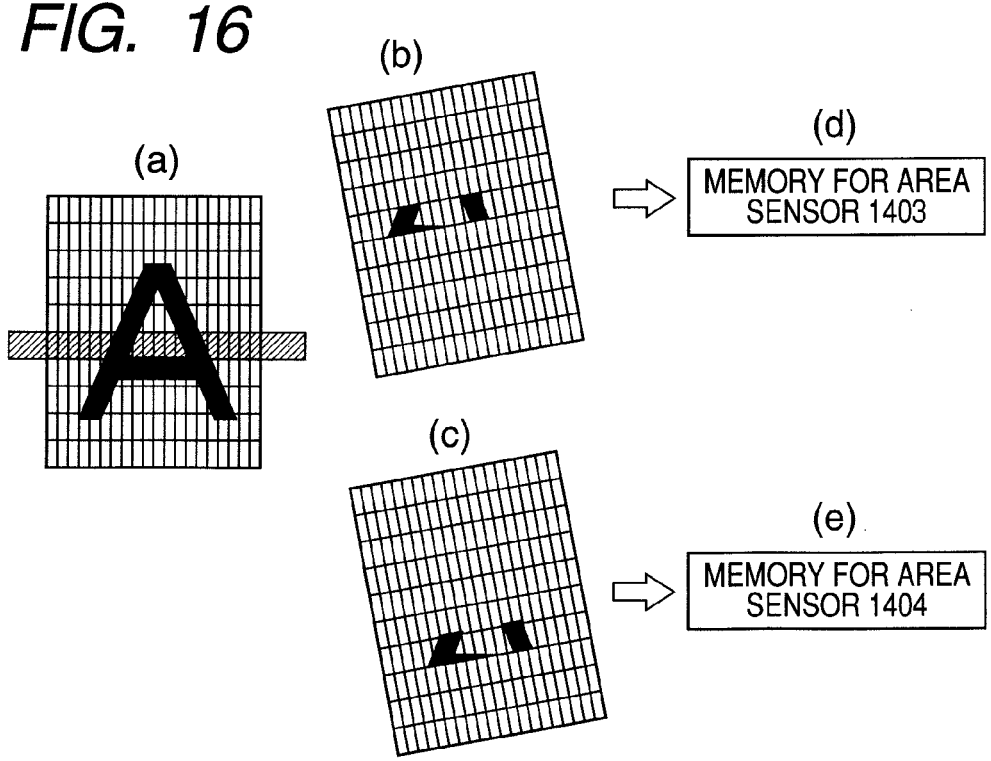

(a), (b), (c), (d) and (e) of FIG. 16 are figures e showing the method for obtaining the line image data with the inclined area sensor.

Figure 17:
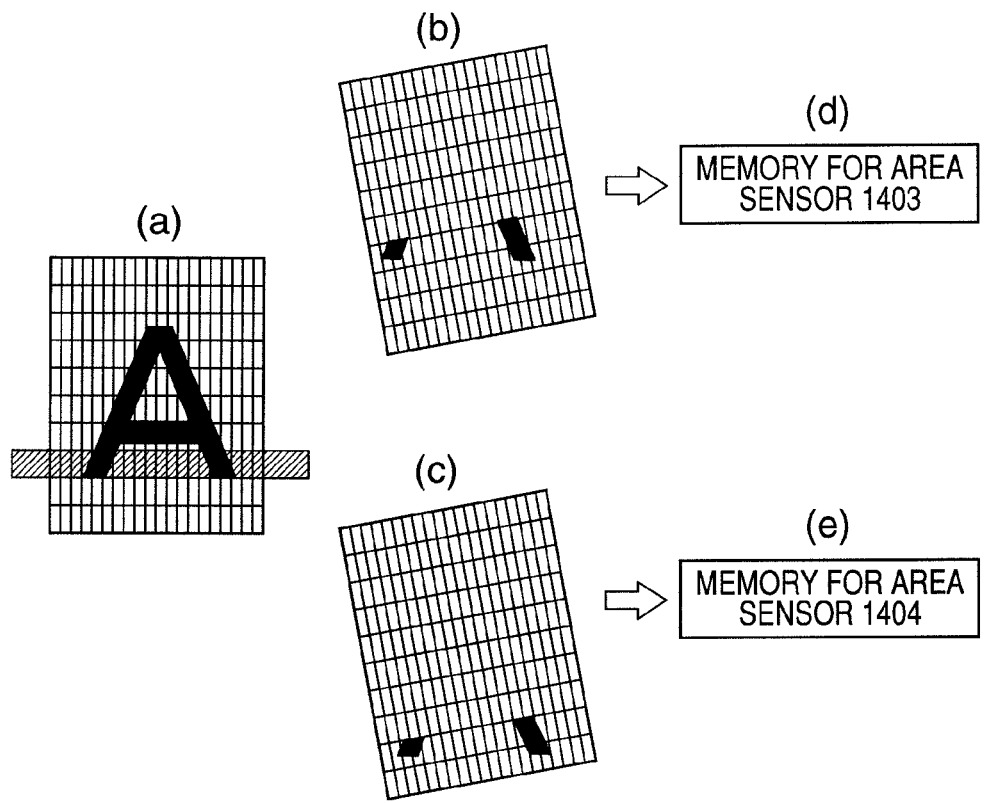

(a), (b), (c), (d) and (e) of FIG. 17 are figures showing the method for obtaining the line image data with the inclined area sensor.

Figure 18:
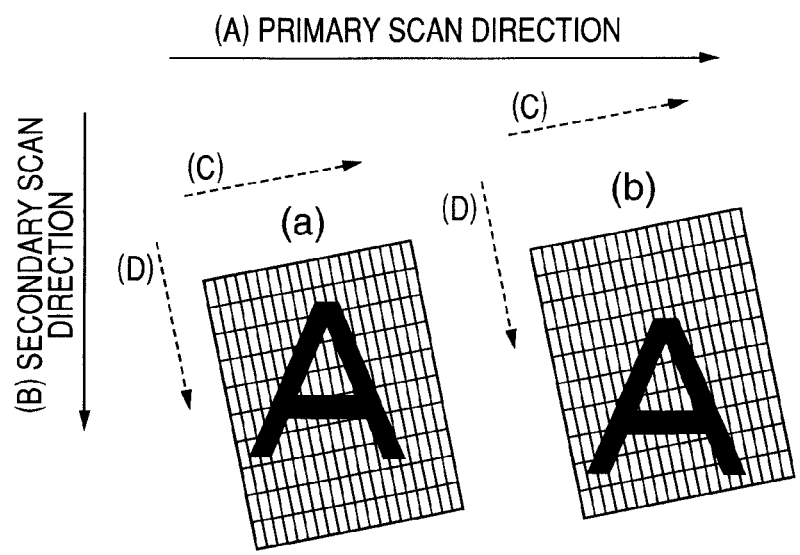

(a) and (b) of FIG. 18 are image data read with a line sensor in the inclined area sensor.

Figure 19:
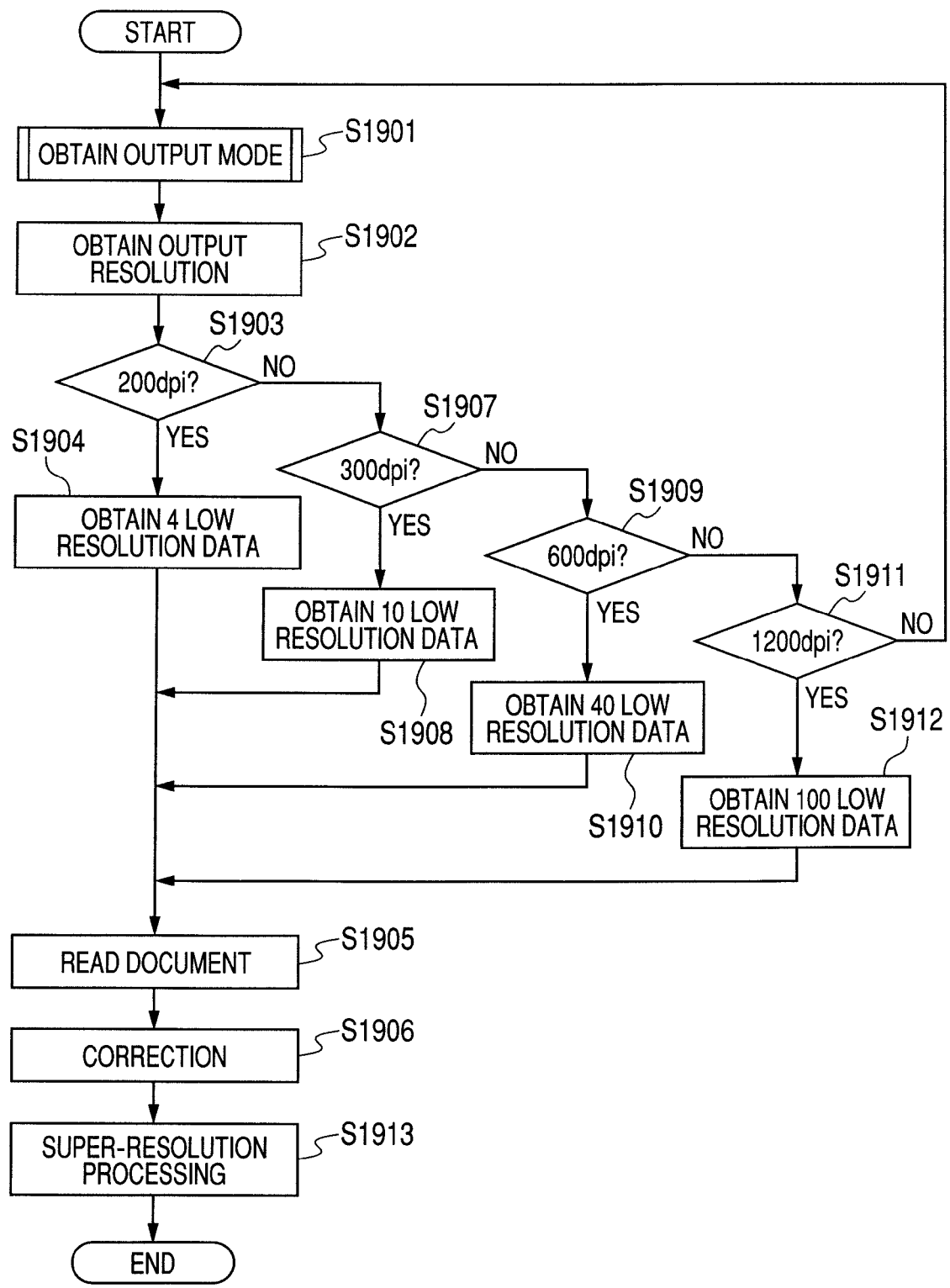

FIG. 19 is a flowchart for describing an outline of operation performing a super-resolution processing mode setting processing according to the first embodiment.

Figure 20:
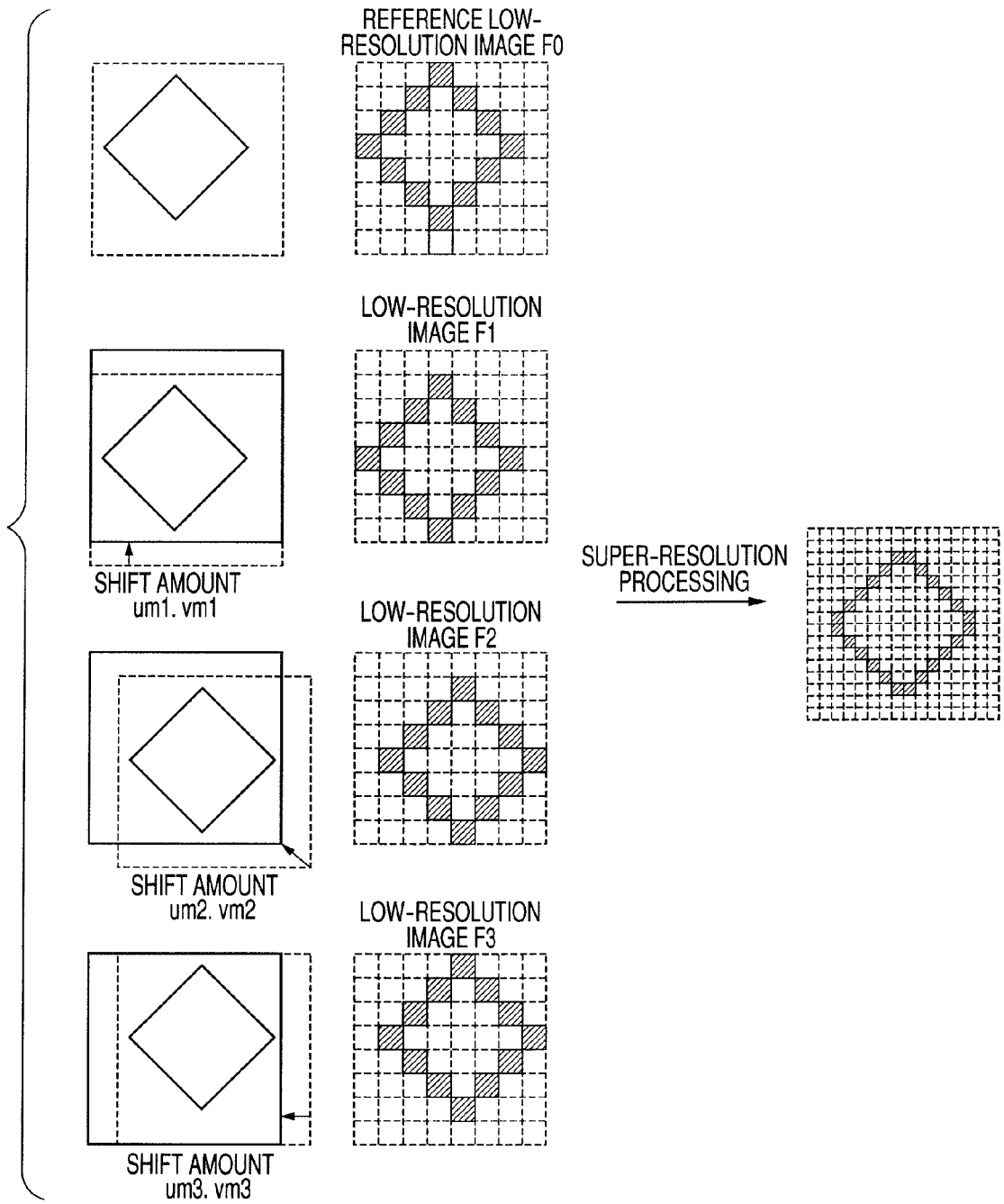

FIG. 20 is a schematic diagram about the detail of the super-resolution processing.

Figure 21:
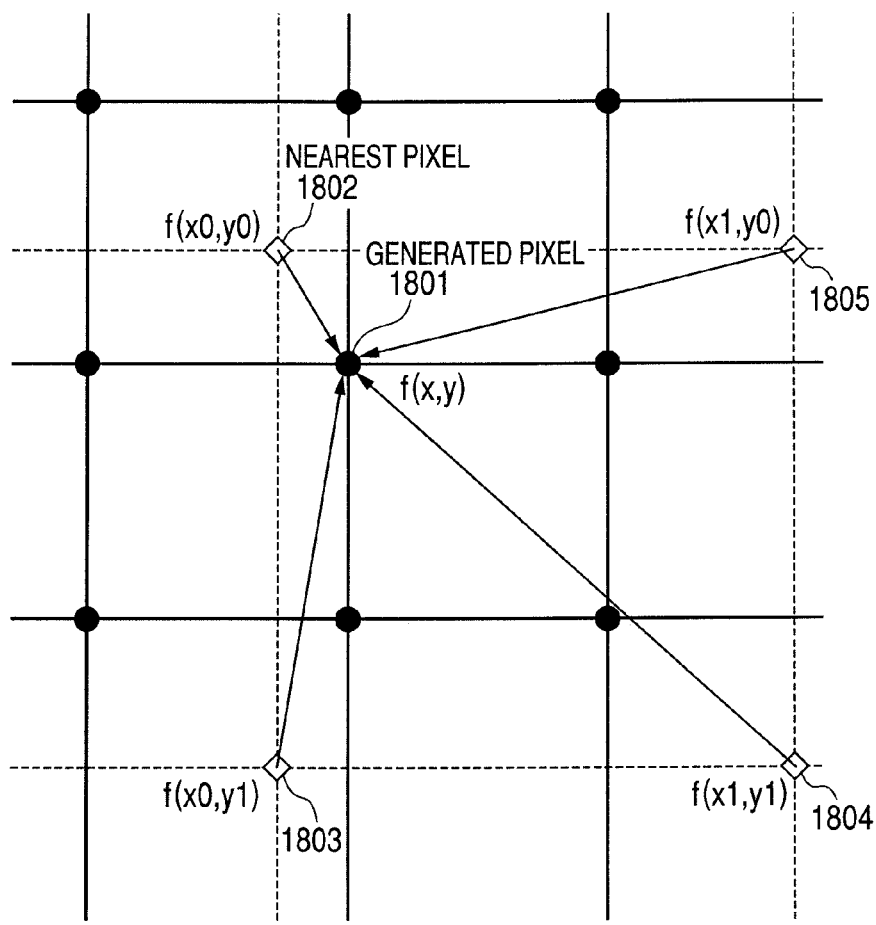

FIG. 21 is a schematic diagram about the detail of the super-resolution processing.

Figure 22:
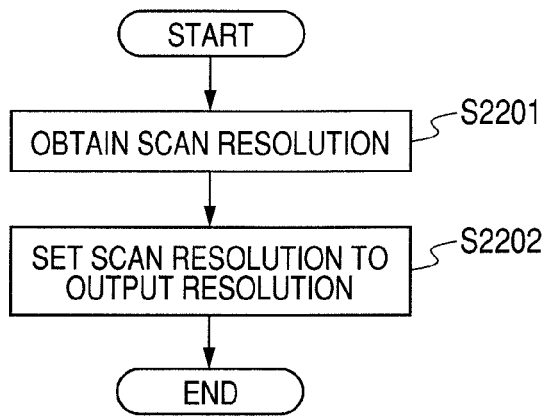

FIG. 22 is a flowchart for describing an outline of operation performing an output mode acquisition processing shown in FIG. 19.

Figure 23:
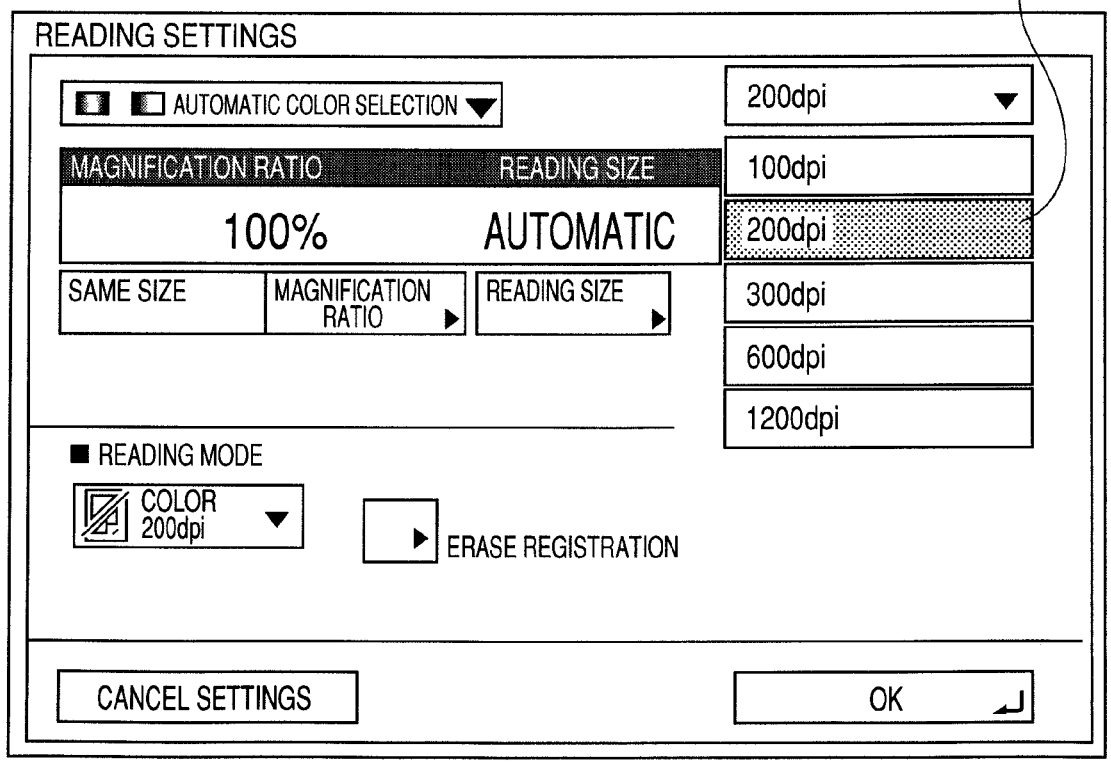

FIG. 23 is a GUI displaying an example of an operation section for setting the output mode acquisition processing shown in FIG. 22 according to the first embodiment.

Figure 24:
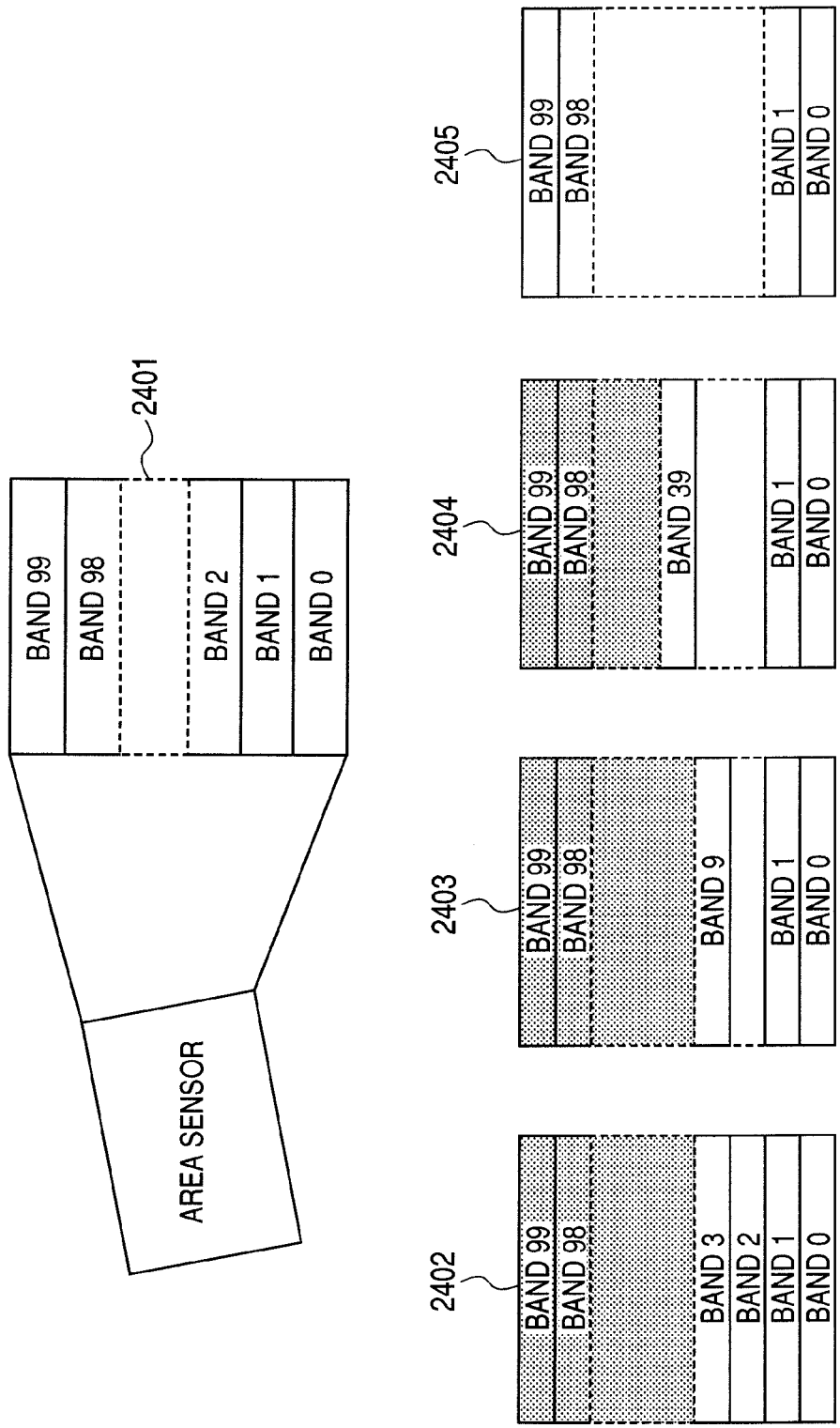

FIG. 24 is a figure showing a dividing method of the area sensor.

Figure 25:
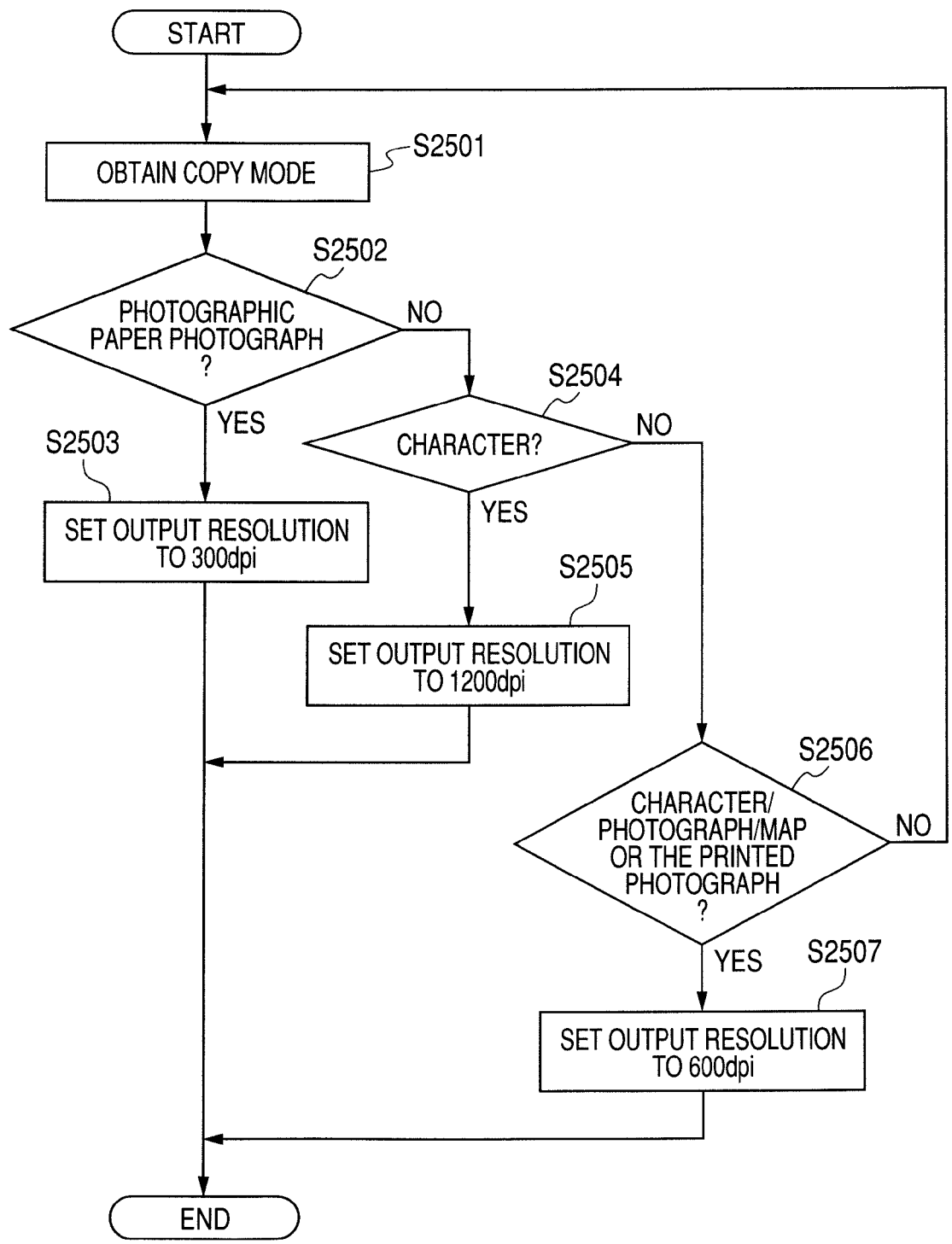

FIG. 25 is a flowchart for describing an outline of operation performing the output mode acquisition processing shown in FIG. 19 according to the second embodiment.

Figure 26:
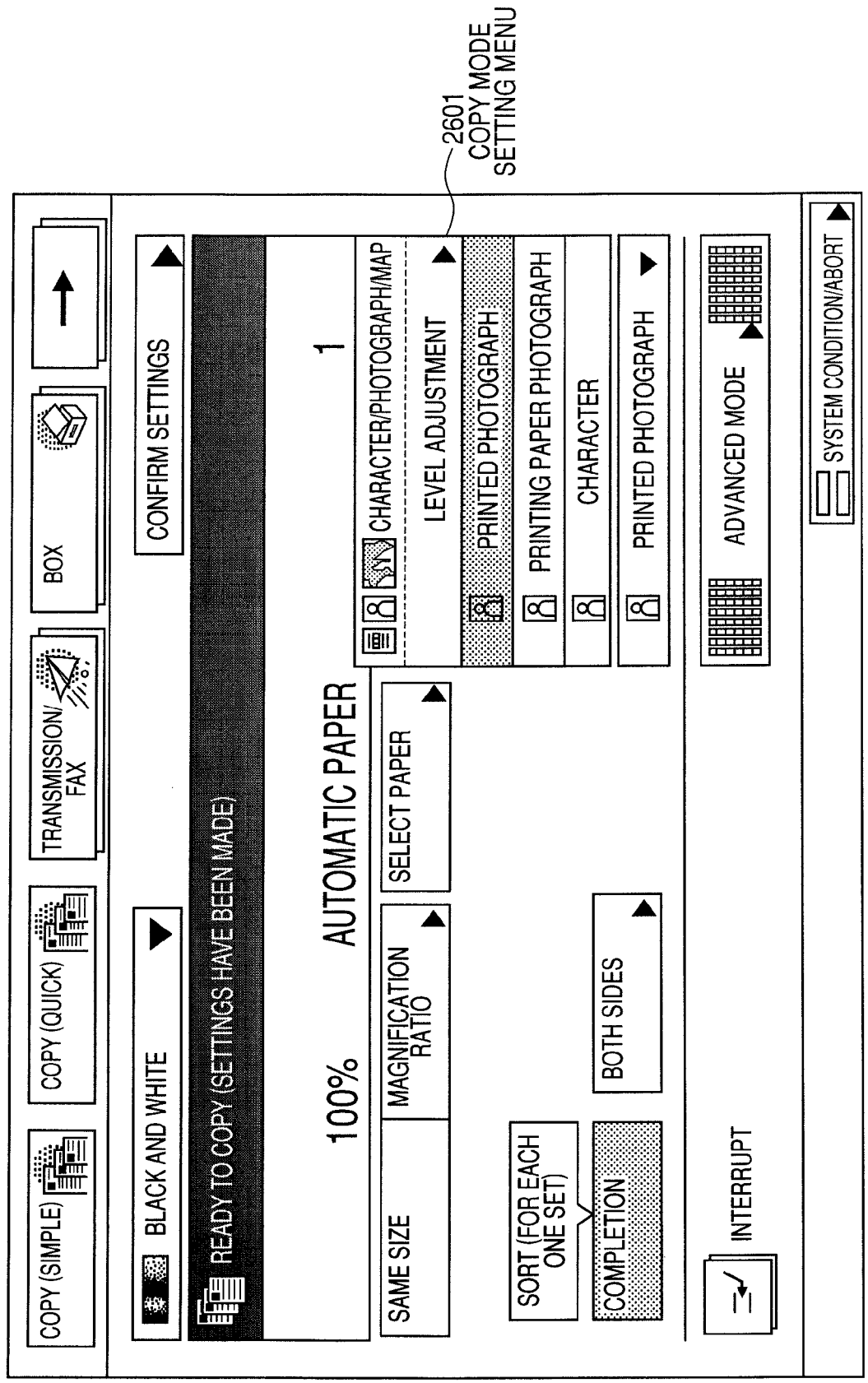

FIG. 26 is a GUI displaying an example of the operation section for setting the output mode acquisition processing shown in FIG. 25 according to the second embodiment.

Figure 27:
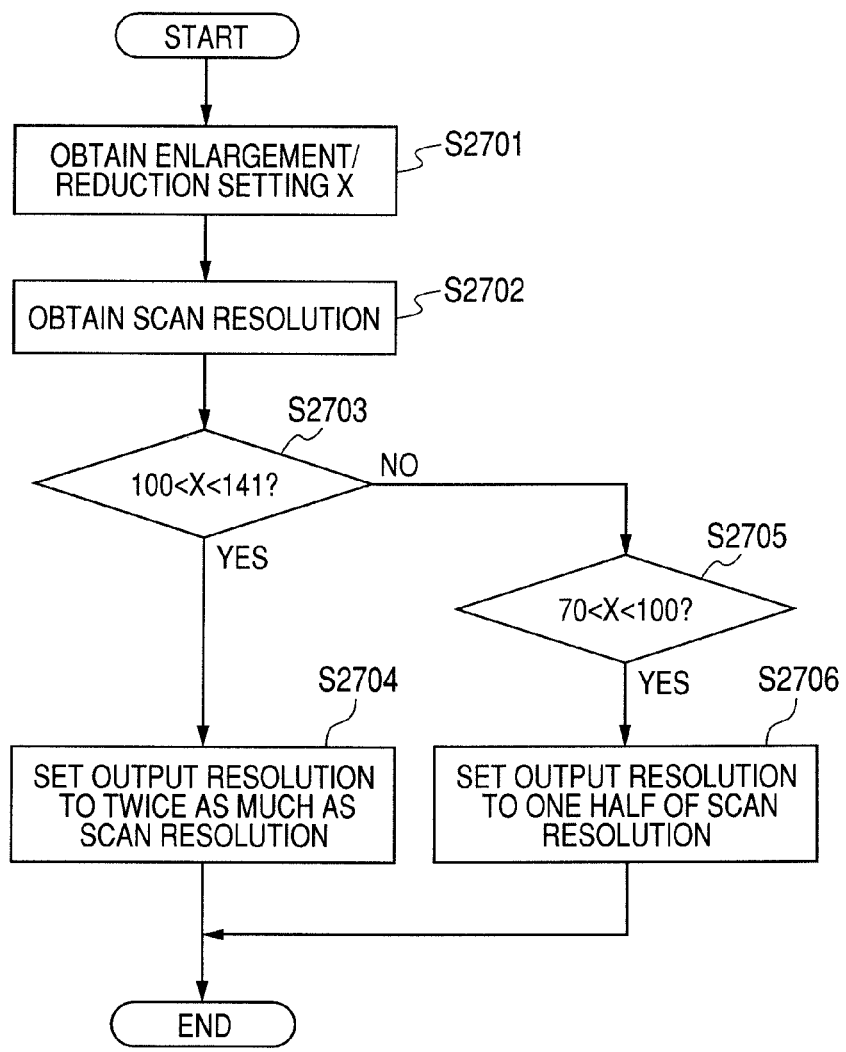

FIG. 27 is a flowchart for describing an outline of operation performing the output mode acquisition processing shown in FIG. 19 according to the third embodiment.

Figure 28:
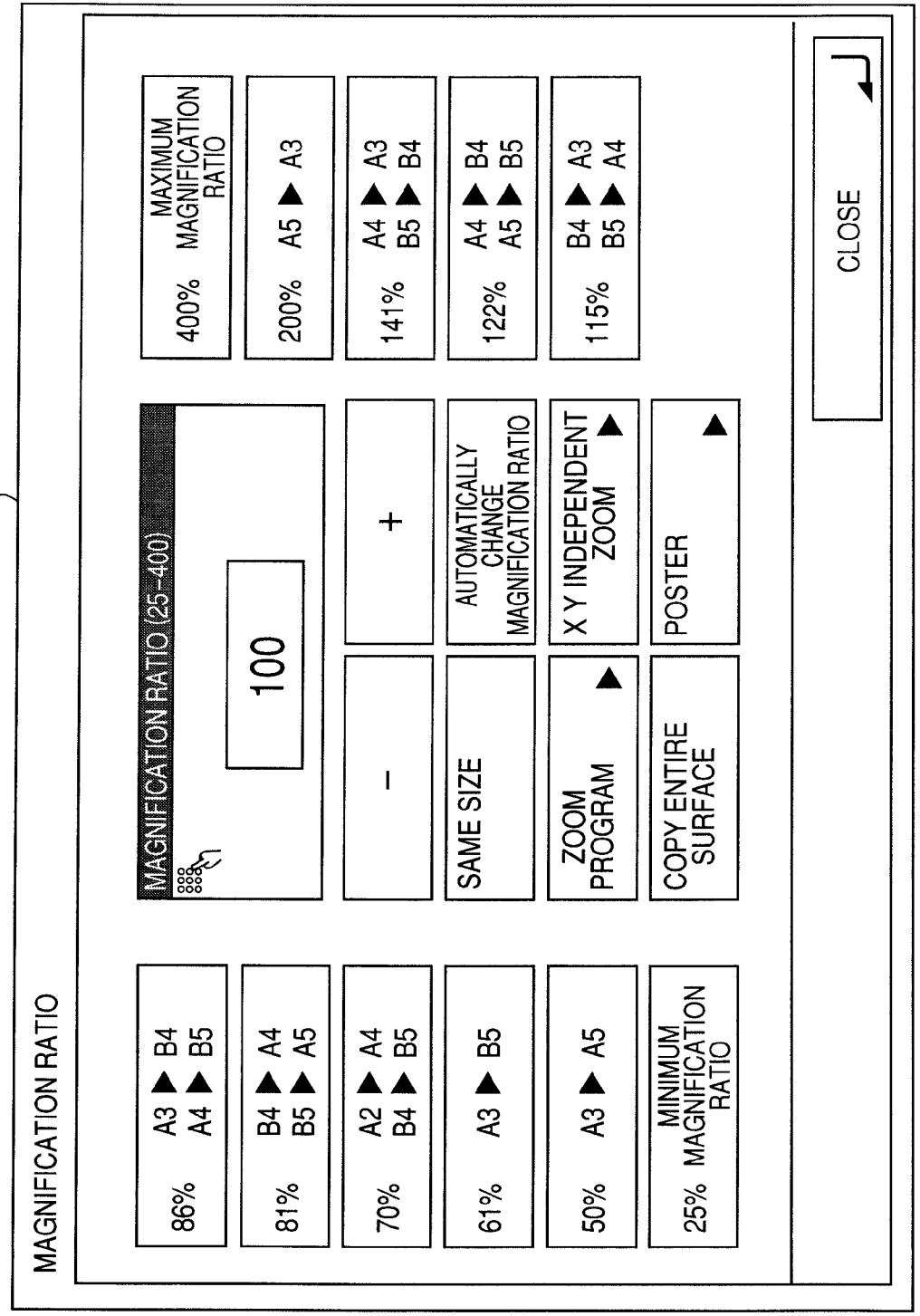

FIG. 28 is a GUI displaying an example of the operation section for setting the output mode acquisition processing shown in FIG. 27 according to the third embodiment.

Figure 29:
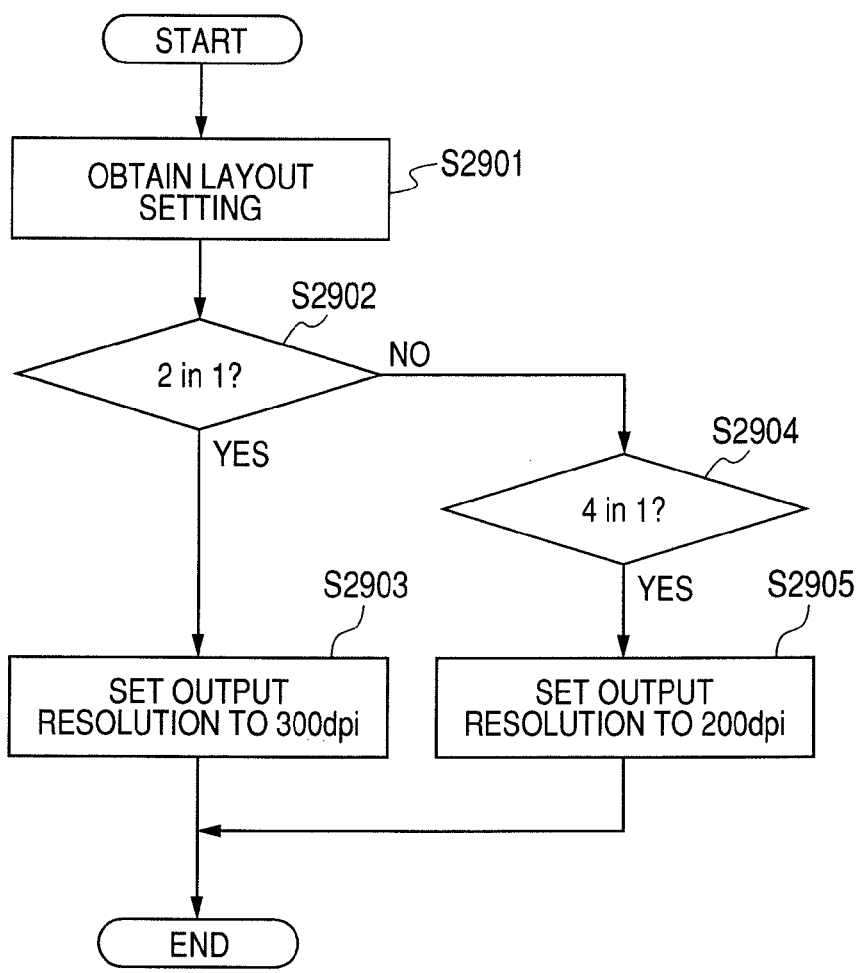

FIG. 29 is a flowchart for describing an outline of operation performing the output mode acquisition processing shown in FIG. 19 according to the fourth embodiment.

Figure 30:
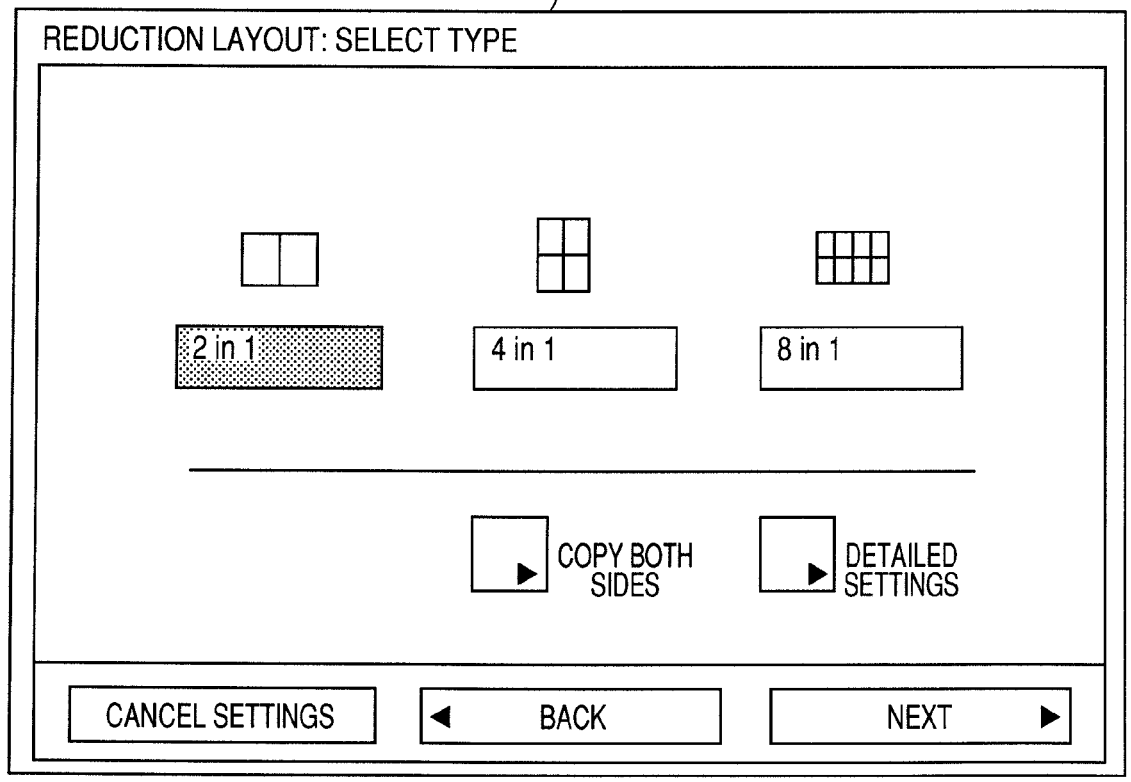

FIG. 30 is a GUI displaying an example of the operation section for setting the output mode acquisition processing shown in FIG. 29 according to the fourth embodiment.

FIG. 31 is a figure showing the dividing method of the area sensor existing in the scanner 11 according to the fifth embodiment.

BEST MODES FOR CARRYING OUT THE INVENTION

Embodiments of the present invention will be hereinafter described with reference to figures.

First Embodiment

An embodiment of the present invention will be described. In the present embodiment, an image processing apparatus having a color scanner is a subject matter, and a technique for generating a high resolution image using an area sensor will be described.

<About External Appearance of Image Processing Apparatus>

Figure 1:
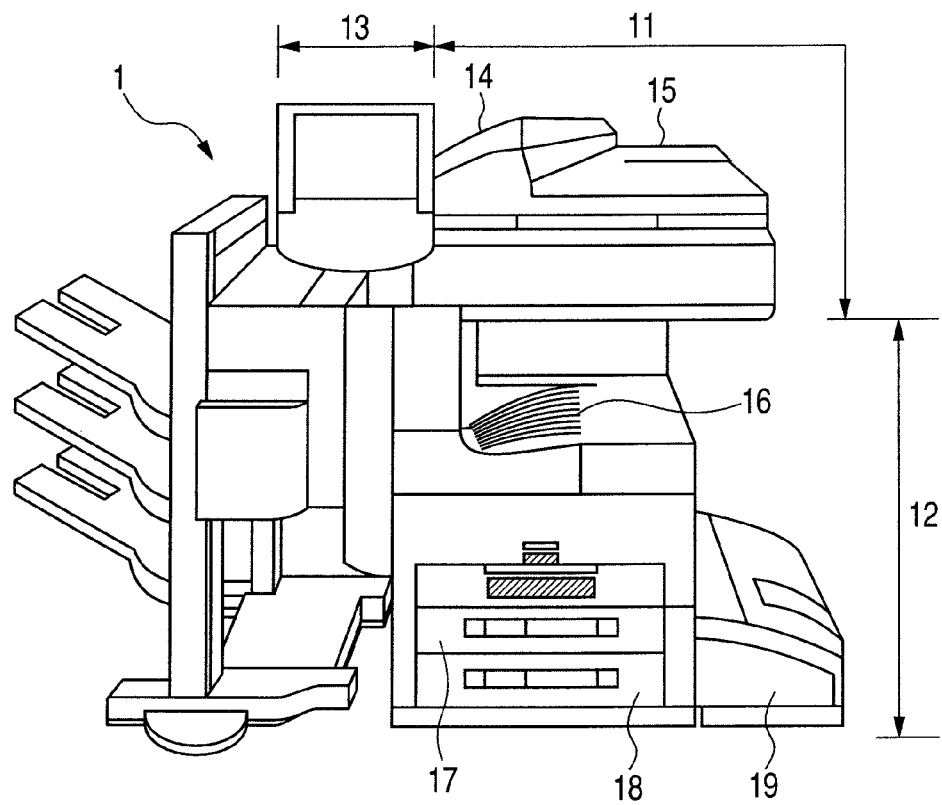
FIG. 1 is a schematic diagram of an image processing apparatus.

An external appearance of an image processing apparatus 1 is shown in FIG. 1. The image processing apparatus 1 is divided into a scanner 11 for reading an original document image, a printer 12 for reproducing read image data, and an operation section 13 for designating various operation settings of the image processing apparatus 1. The scanner 11 converts information of the original document image into an electric signal by inputting into a CCD a reflected light obtained by exposing and scanning an image on the original document image. The scanner 11 further converts the electric signal into a brightness signal including R, G, B colors, and outputs this brightness signal as image data to a controller 20 later described in FIG. 3.

It should be noted that the original document image is set on a tray 14 of a document feeder 15. When a user instructs to start reading with an operation section 13, an original document image-reading instruction is given from the controller 20, later described in FIG. 3, to the scanner 11.

Upon receiving this instruction, the scanner 11 perform a reading operation of the original document image by feeding, one by one, the original document images from the tray 14 of the document feeder 15.

It should be noted that a reading method of the original document image should not necessarily be an automatic feeding method with the document feeder 15, but may be a method for scanning the document upon placing the original document image on a glass surface, not shown, and moving an exposure section.

The printer 12 is an image processing device for forming image data, received from the controller 20, on a sheet. It should be noted that although an image processing method of the present embodiment is an electrophotographic method using a photosensitive drum and a photosensitive belt, the present invention is not limited thereto. For example, an inkjet method for printing by propelling ink onto a sheet through a minute nozzle array may also be applied. The printer 12 is arranged with multiple paper cassettes 17, 18, 19 to allow selection of different sheet sizes and different sheet orientations. The sheets finished with printing are discharged to a discharge tray 16.

(Structure of Reading Section of Image Processing Apparatus)

Figure 2:
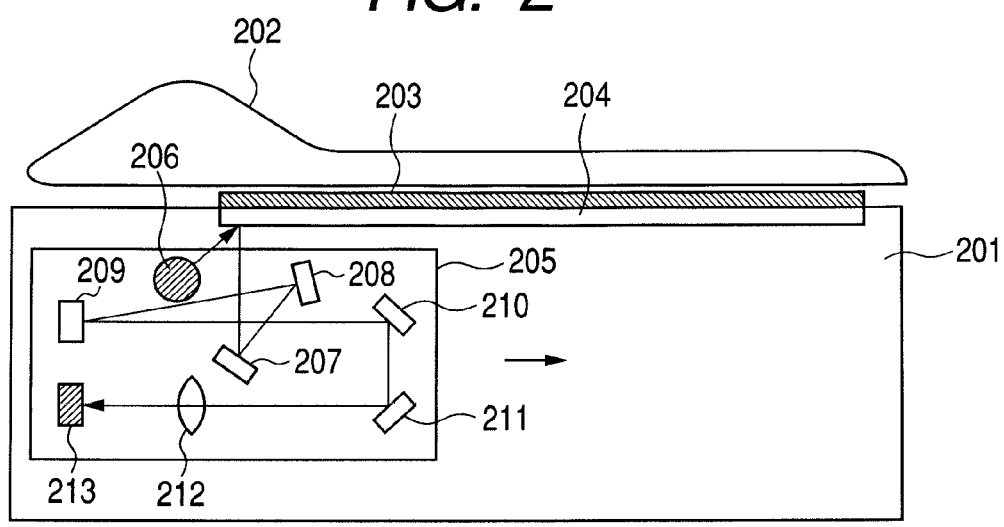
FIG. 2 is a figure showing a structure of a reading section of an image processing apparatus 1.

FIG. 2 is a figure showing a structure of a reading section of a multifunction apparatus to which the present embodiment is applied.

In the figure, the apparatus comprises a reading section 201, and an ADF section 202 which has an ADF function for holding an original document 203 and conveying the original document to a document reading position during successive reading.

The apparatus further comprises a glass plate, or a platen, which mounts the original document 203 for reading of an original document image on the original document.

The apparatus still further comprises a unit 205 which includes a reading device for reading the original document image 203, and includes a device for photographing the original document image.

A light source 206 is provided, and a white light source such as a xenon tube is used therefor.

Mirrors 207 to 211 are provided which have a role to transmit to a photographing element a reflected light of a light emitted from the light source 206 to the document surface.

A lens 212 is provided which condenses the reflected light coming from the original document image and reflected by the mirror 212 into the width of a photographing element 213.

<Detailed Description of Controller>

Figure 3:
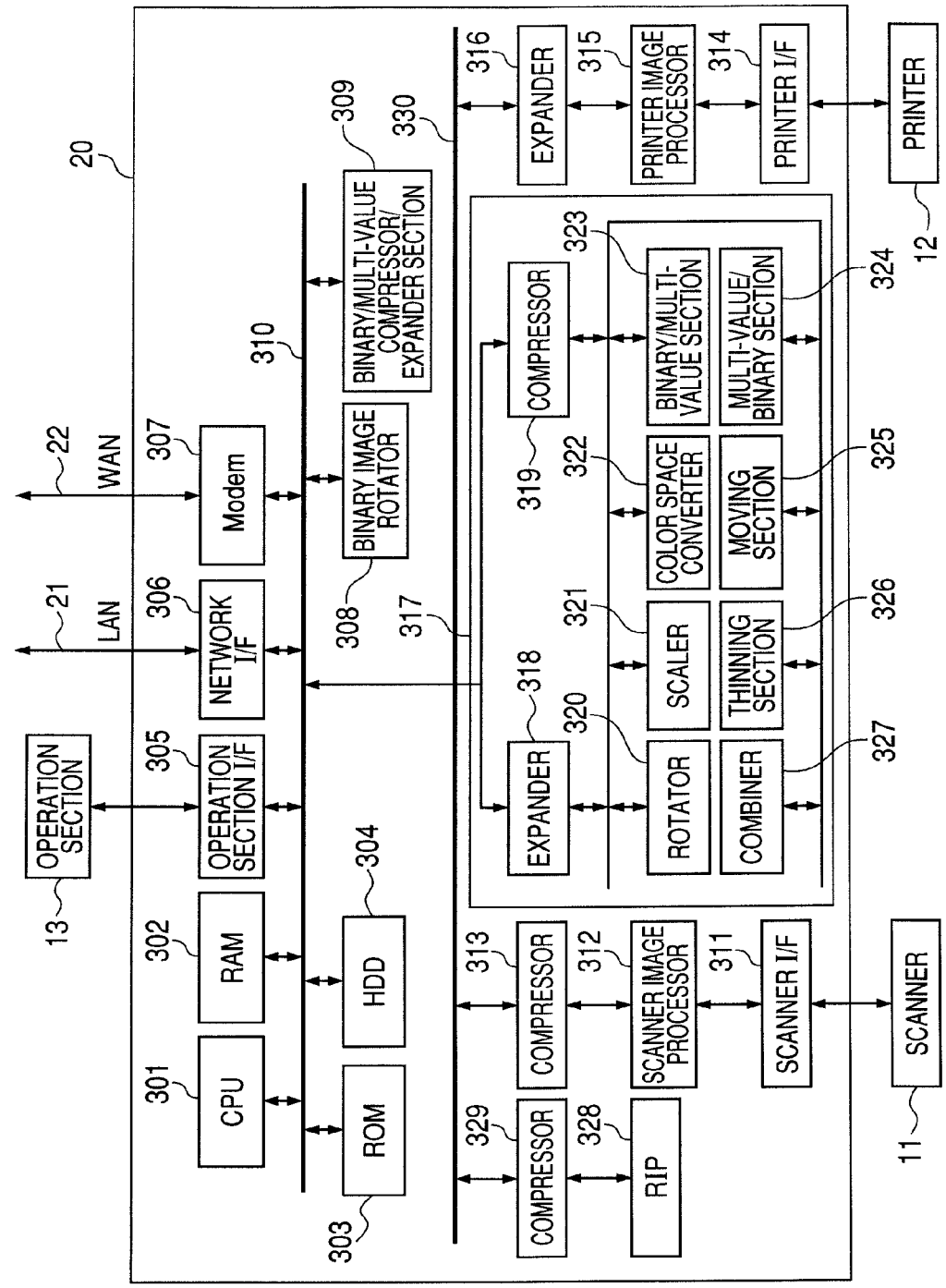
FIG. 3 is a block configuration diagram showing a controller structure of the image processing apparatus 1.

FIG. 3 is a block diagram for describing the detail of a structure of the controller 20 existing in the image processing apparatus 1.

The controller 20 is electrically connected to the scanner 11 and the printer 12, and on the other hand, is connected to an external apparatus via a LAN 21 or a WAN 22. Thus, the controller 20 can input and output image data and device information.

A CPU 301 controls accesses to various connected devices based on a control program memorized in a ROM 303. The CPU 301 also controls various processings performed in the controller 20.

A RAM 302 is a system work memory for allowing the CPU 301 to operate, and is the memory for temporarily memorizing the image data. The RAM 302 includes an SRAM for holding the memorized content even after power-off and a DRAM for erasing the memorized content after power-off.

The ROM 303 contains a boot program for the apparatus. An HDD 304 is a hard disk drive that can contain system software and the image data.

An operation section I/F 305 is an interface section for connecting a system bus 310 and the operation section 13. The operation section I/F 305 not only receives from the system bus 310 the image data to be displayed on the operation section 13 and outputs the image data to the operation section 13, but also outputs information input from the operation section 13 to the system bus 310.

A network I/F 306 is connected to the LAN 21 and the system bus 310, and inputs and outputs information. A modem 307 is connected to the WAN 22 and the system bus 310, and inputs and outputs information. A binary image rotator 308 converts an orientation of the image data prior to transmission. A binary image compressor/expander 309 converts a resolution of the image data prior to transmission into a predetermined resolution or a resolution according to capabilities of an opponent. It should be noted that methods such as JBIG, MMR, MR, and MH are used for compression and extension. An image bus 330 is a transmission path for sending and receiving the image data, and is made of a PCI bus or an IEEE 1394.

A scanner image processor 312 performs correction, processing, and editing on the image data received from the scanner 11 via the scanner I/F 311. It should be noted that the scanner image processor 312 makes a determination as to whether the received image data is a color document or a black and white document and whether a character document or a picture document. Then, the determination result is attached to the image data. Such accompanying information is called attribute data. The processings performed by this scanner image processor 312 will be described later in detail.

A compressor 313 receives the image data, and divides this image data into units of blocks in 32 pixels by 32 pixels. It should be noted that this image data in 32 pixels by 32 pixels is called tile data. An area of an original document (paper medium not yet being read) corresponding to this tile data is called a tile image. It should be noted that average brightness information in this block in 32 pixels by 32 pixels and a coordinate position on the original document of the tile image are attached as header information to the tile data. Furthermore, the compressor 313 compresses the image data including multiple tile data. An expander 316 expands the image data including the multiple tile data, and thereafter, performs raster expansion and transmits the image data to a printer image processor 315.

The printer image processor 315 receives the image data sent from the expander 316, and performs an image processing on the image data while referring to attribute data attached to this image data. The image data having been subjected to the image processing is output to the printer 12 via a printer I/F 314. The processing performed by this printer image processor 315 will be later described in detail.

An image converter 317 performs a predetermined conversion processing on the image data. Processors as shown below constitute this processor.

An expander 318 expands the received image data. A compressor 319 compresses the received image data. A rotator 320 rotates the received image data. A scaler 321 performs a resolution conversion processing (for example, from 600 dpi to 200 dpi) on the received image data. A color space converter 322 converts a color space of the received image data. This color space converter 322 can use a matrix or a table to perform a known background color removal, to perform a known LOG conversion processing (RGB to CMY), and to perform a known output color correction processing (CMY to CMYK). A binary multi-value converter 323 converts the received two-level grayscale image data into 256-level grayscale image data. In reverse, a multi-value binary converter 324 converts the received 256-level grayscale image data into two-level grayscale image data through a method such as error diffusion processing.

A combiner 327 combines the received two image data to generate one image data. It should be noted that the two image data are combined through methods such as a method for making an average value of brightness values of pixels to be combined a combined brightness value and a method for making a brightness value of a brighter pixel in brightness level a brightness value of a combined pixel. In addition, it may be possible to employ a method for making a darker one the combined pixel. Furthermore, it may also be possible to employ a method for determining the combined brightness value through logical OR operation, logical AND operation, and exclusive OR operation of the pixels subjected to combining. Either of these combining methods is a known method. A thinning section 326 converts the resolution by thinning out pixels in the received image data to generate ½, ¼, ⅛ image data. A moving section 325 adds a blank portion to the received image data and deletes the blank portion therefrom.

A RIP 328 receives intermediate data generated based on a PDL code data transmitted from a printer server (not shown), generates bit map data (multiple values), and compresses the bit map data with a compressor 329.

<Detailed Description of Scanner Image Processor 312>

Figure 4:
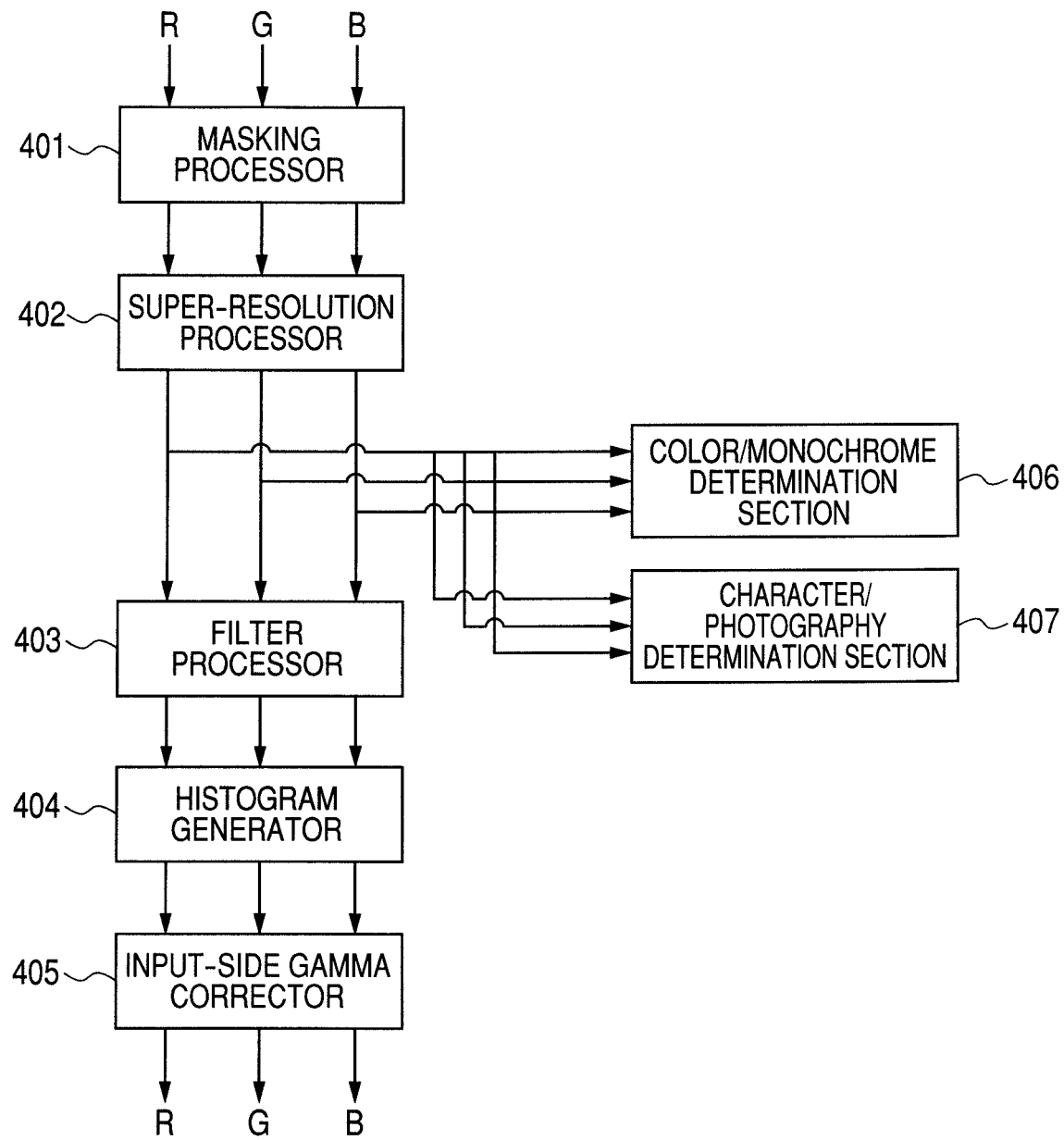
FIG. 4 is a block configuration diagram showing an internal structure of a scanner image processor 312.

FIG. 4 shows an internal structure of the scanner image processor 312.

The scanner image processor 312 receives the image data including the brightness signal of RGB, each in 8-bit, via the scanner I/F 311 from the scanner 11. This brightness signal is converted by a masking processor 401 into a standard brightness signal not relying on a filter color of the CCD.

A filter processor 403 arbitrarily corrects a spatial frequency of the received image data. This processor uses, for example, 7 by 7 matrix to perform a calculation processing on the received image data. In the meantime, on a copier, a user can select a character mode, a photography mode, a character/photography mode by operating the operation section 13. Herein, in a case where the user selects the character mode, the filter processor 403 applies a character filter on the entire image data. In a case where the photography mode is selected, a photography filter is applied on the entire image data. In a case where the character/photography mode is selected, the filter is adaptively switched for each pixel according to a later-described character photography determination signal (a portion of the attribute data). That is, a determination is made for each pixel as to whether the photography filter is applied or the character filter is applied. It should be noted that the photography filter is set with such coefficients that only high frequency components are smoothed. This is to render unevenness of the image inconspicuous. On the other hand, the character filter is set with such coefficients that edge emphasis is strongly applied. This is to increase sharpness of characters.

A histogram generator 404 samples brightness data of each pixel constituting the received image data. To describe in more detail, brightness data in a rectangular area enclosed by a start point and an end point designated in each of the primary scan direction and the secondary scan direction are sampled at a constant pitch in the primary scan direction and the secondary scan direction. Then, histogram data is generated based on the sampling result. The generated histogram data is used to predict a background level when the background color removal is performed. An input side gamma corrector 405 converts, with a table, the generated histogram data into brightness data having nonlinear characteristic.

A color monochrome determination section 406 makes a determination as to whether each pixel constituting the received image data is chromatic color or achromatic color, and the determination result is attached as a color monochrome determination signal (a portion of the attribute data) to the image data.

A character photography determination section 407 makes a determination, based on a pixel value of each pixel and pixel values of surrounding pixels around each pixel, as to whether each pixel constituting the image data is a pixel constituting a character, a pixel constituting a halftone dot, a pixel constituting a character in the halftone dot, and a pixel constituting a solid image. A pixel not applicable to either of them is a pixel constituting a white area. Then, this determination result is attached as a character photography determination signal (a portion of the attribute data) to the image data.

A super-resolution processor 402 performs a super-resolution processing on the received image data. It should be noted that on a copier, a user can select a processing mode of the super-resolution processing by operating the operation section 13.

The processing modes of the super-resolution processing will be described later in detail. There exist conditions for performing the super-resolution processing.

That is, it is necessary to have multiple frames of image data of the original document image having minute shifts of reading positions in the primary scan direction and/or the secondary scan direction with respect to image data of the original document image having been read first at a sensor resolution of the reader.

Namely, it is necessary to have multiple, successive frames of image data whose positions of the original document read by the sensor are shifted little by little in the primary scan direction and/or the secondary scan direction from the image data serving as the reference.

In addition, when these multiple frames of image data are read, the shifts of the reading positions of the original document image, existing between the image data obtained with adjacent sensors, need to be less than one pixel (subpixel) in the primary scan direction and/or the secondary scan direction.

This shift of the reading position may be a shift less than one pixel that remains as a result of a shift correction performed on a positional shift in integral multiples.

Hereinbelow, data read when the original document image including one screen (frame) is scanned, namely, data constituting this one screen (frame) of the original document image, is hereinafter called "frame image data".

A position of a pixel being read on the original document image is called "phase".

A shifting of this phase is referred to as "phase is shifted", and the shift of the read pixel is called "phase shift".

A low resolution used here is not limited to 300 dpi, but means a resolution of an image that the apparatus outputs in normal printing.

The primary scan direction is a direction perpendicular to a direction that a unit 205 moves with respect to the original document image when the scanner reads the original document image placed on a document table.

Figure 8:
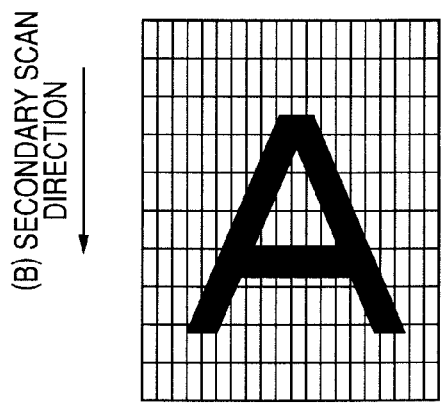
FIG. 8 is an original document image read by the area sensor.

In FIG. 8, the primary scan direction is shown by arrow A, which is a lateral direction of this read original document image.

Similarly, the secondary scan direction is a direction horizontal to the moving direction of the unit 205.

In FIG. 8, the secondary scan direction is shown by arrow B, which is a longitudinal direction of this read original document image.

In the present embodiment, the area sensor is obliquely arranged, so that multiple images having phase shifts with respect to the primary scan direction and the secondary scan direction can be obtained for each RGB channel.

Figure 5:
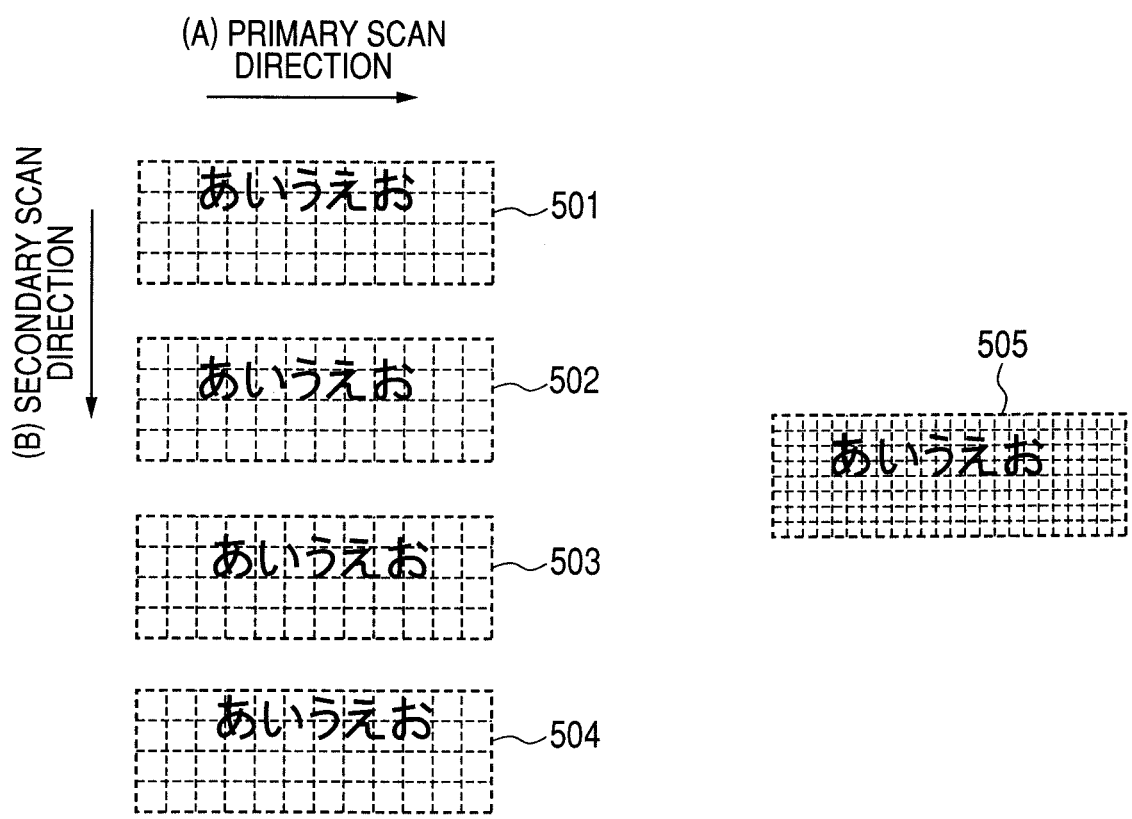
FIG. 5 is a figure showing an example of an image obtained with a scanner 11.

FIG. 5 shows examples of the image obtained through the present embodiment.

Images 501 to 504 are obtained in a state where the phase is shifted in each of the primary scan direction and the secondary scan direction.

(Area Sensor)

In the present embodiment, the sensor for reading the image includes the area sensor.

The area sensor is a photographing element applied to a digital camera and the like. In contrast to the above-described sensors in units of lines, the area sensor has two-dimensionally arranged pixel sensors for reading data.

Figure 7:
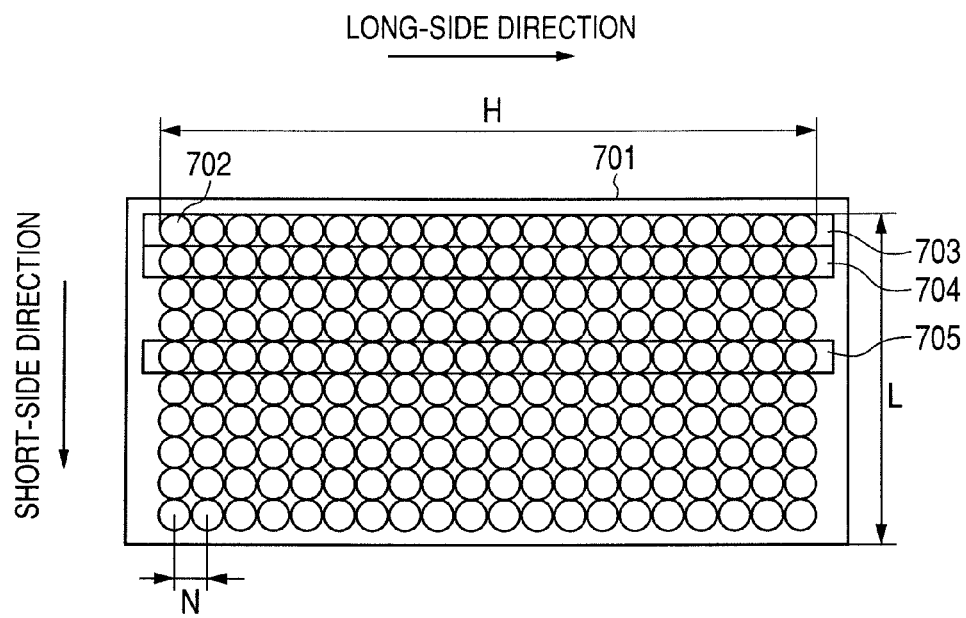
FIG. 7 is a figure showing a structure of an area sensor.

FIG. 7 is a figure showing a structure of the area sensor. In FIG. 7, numeral 701 denotes an area sensor device.

Pixel sensors 702 in the area sensor 701 includes pixel sensors having H pixels in a long side and L pixels in a short side.

This one pixel may be a pixel sensor supporting colors including RGB made by dividing the pixel sensor for this one pixel into four. It may also be possible to set H pixels=L pixels (long side=short side).

The resolution of this area sensor is determined by a distance N between the pixel sensors.

The area sensor used in a high resolution digital camera includes extremely many pixels as long-side pixel sensors and shorter side pixel sensors. For example, there exists a digital camera of ten million pixels class that has 3,800 pixels as the long-side pixel sensors and 2,800 pixels as the short-side pixel sensors.

Generally, when the area sensor is used for a camera, the area sensor photographs by capturing input image data as a two-dimensional area.

That is, in one photographing, the two-dimensionally arranged pixel sensors are used to photograph. When the area sensor device is attached to the reader, the pixel sensors are arranged without inclination so that the photographed original document image does not have a distortion in the lateral direction and the longitudinal direction.

Thus, the arrangement is made to eliminate any shift in an oblique direction in a case where the photographed image is reproduced.

For example, in a case where the area sensor is attached in a commonly used camera, the image data read by the pixel sensors on a line shown by a black border 703 are image data constituting an uppermost portion of a photographed object.

In such occasion, the read image data is caused to be not inclined in a direction constituting a line.

Similarly, image data read by the pixel sensors on a line shown by a black border 704 is image data at a position different from the position of the photographed object read by numeral 703, namely, image data at a position below in a vertical direction. Thus, numeral 705 is the image data at a position four lines below in the vertical direction with respect to the photographed position read by numeral 703.

In this way, when the area sensor of the digital camera is used, the image data is photographed as the two-dimensional area. Thus, the pixel sensors constituting the area sensor are all photographing different positions of the photographed object.

However, the usage method of the area sensor in the apparatus used in the present embodiment is different from a usage method in the above-described digital camera.

First, the area sensor as shown in FIG. 7 is attached to an arrangement position serving as a reference of the reader.

When the original document image is placed at a designated position on the platen 204 in FIG. 1, condensed on a sensor is a reflected light of a light emitted to the original document image from a light source scanning parallel under the original document image in the same direction as the longitudinal direction of the original document image. This reflected light is incorporated in such manner that the reflected light does not incline with respect to the sensor.

The reflected light, as one line of image data, obtained through the parallel scanning of the light source is condensed parallel to the lateral direction (long-side direction) of the sensor shown in FIG. 7.

Thus, the sensor is arranged at a position capable of incorporating the original document image substantially without inclination.

As described above, the arrangement position of the sensor for realizing the output of the original document image is made "a reference arrangement position" of the sensor.

For the purpose of simplicity of the description, it is assumed in this description that the sensor includes the pixel sensors having 20 pixels in the long-side direction and 10 pixels in the short-side direction.

Needless to say, a structure that the long-side direction=the short-side direction may also be possible.

It should be noted that the number of the above-described pixel sensors is for the purpose of describing usage and structure of the area sensor according to the present embodiment, and is not limited to the number of the pixel sensors shown in the figure.

In reality, needless to say, it may also be possible to structure with as many pixel sensors as used in the digital camera.

An original document image 103 placed on the platen 204 is read by driving the reading unit 205 including the area sensor 213 in the reader in a direction of the arrow illustrated in FIG. 2.

That is, a reading operation is performed by handling the reading line sensors 704 and 705, i.e., a group of pixel sensors, just like the above-described line sensor.

Next, described is how the original document image read by the reading line sensors 704 and 705 becomes.

In this description, it is assumed that FIG. 8 is the original document image to be read.

What is shown in a lattice in the figure corresponds to the resolution of the pixel sensors constituting the reading line sensor 704 or 705.

When the reading unit 205 drives and moves under the document table in the secondary scan direction, the image data input to the reading line sensors 704 and 705 are successively read.

That is, among the original document image, a portion corresponding to a line width equivalent to the position of the reading unit 205 is read from moment to moment.

A process for reading this original document image will be described.

When the reading unit 205 moves under the document table in the secondary scan direction, shaded areas of the original document image shown in (a) of FIG. 9, (a) of FIG. 10, (a) of FIG. 11, (a) of FIG. 12 are exposed to the light from the light source.

First, at a certain instance, the shaded area in (a) of FIG. 9 is exposed to the light from the light source.

Then, the area sensor detects the light to detect the original document image at a line width portion, i.e., a portion exposed to the light.

For example, at this moment, the line sensor 704 detects the image data as shown in (b) of FIG. 9.

At the same time, the line sensor 705 detects image data as shown in (c) of FIG. 9.

The reason why there simultaneously exists a shift between the reading positions of the two image data is that the two line sensors are arranged with a physical distance in the short-side direction.

Then, the read original document image is treated as different image data by each reading line sensor, and the image data are separately memorized to memory media such as memories as shown in (d) and (e) of FIG. 9.

Next, as the sensor unit 205 moves and the light source moves, the position of the original document image detected by the line sensor changes as shown in (a) of FIG. 10. Then, the line sensor 704 detects an image as shown in (b) of FIG. 10, and the line sensor 705 detects an image as shown in (c) of FIG. 10.

The read original document images are treated as different image data by each reading line sensor, and the image data are separately memorized to memory media such as memories as shown in (d) and (e) of FIG. 10.

Similarly, when the position as shown in (a) of FIG. 11 is read, image data as shown in (b) and (c) of FIG. 11 are memorized to memory media such as memories as shown in (d) and (e) of FIG. 11.

On the other hand, when the position as shown in (a) of FIG. 12 is read, image data as shown in (b) and (c) of FIG. 12 are memorized to memory media such as memories as shown in (d) and (e) of FIG. 12.

Eventually, the entire original document image is exposed to the light from the light source, and each line sensor reads the image data at each position.

Then, the read image data are successively stored to the memories, and multiple image data with the shift equivalent to one pixel in the secondary scan direction as shown in each of (a) and (b) of FIG. 13 can be obtained.

These image data having the shift in the secondary scan direction can obtain as many frame image data as the number of line sensors including the group of area sensors.

Thus, in a case where the pixel sensors, two-dimensionally arranged to read the image, is used as the area sensor, multiple frames of frame image data whose phases are continuously shifted in the secondary scan direction are obtained through one reading operation.

Next, the usage method of the area sensor in the apparatus used in the present embodiment is described.

First, the area sensor as shown in FIG. 7 is inclinedly mounted to the reader.

An example of a mounting form of the area sensor according to the present embodiment is shown in (a) of FIG. 14.

Numeral 1401 denotes the area sensor device.

Numeral 1402 denotes the image sensor, and it is assumed in this description that the image sensor includes the pixel sensors having 20 pixels in the long-side direction and 10 pixels in the short-side direction.

Then, the area sensor is mounted in such manner that the area sensor inclines with respect to the reference arrangement position.

That is, the area sensor is arranged at an angle θ with respect to the line sensor arranged at the lowermost of the area sensor when arranged at the reference arrangement position as shown in FIG. 7.

The positions of the constituting pixel sensors are indicated assuming a top left end as the origin point, the long-side direction as x direction, and the short-side direction as y direction.

That is, the coordinate of the top left end is (x, y)=(0, 0), and the coordinate of the top right end is (x, y)=(19, 0).

Similarly, the coordinate of the bottom left end is (x, y)=(0, 9), and the coordinate of the right bottom end is (x, y)=(19, 9).

Numeral 1403 denotes a group of one line of the pixel sensors constituting an area sensor 1401, and specifically, includes 20 pixel sensors constituting the long-side direction.

That is, numeral 1403 includes the pixel sensors at the coordinate positions (0, 4), (1, 4), (2, 4), . . . (19, 4).

It should be noted that in the below description, multiple pixel sensors enclosed by the numeral 1403 are called a reading line sensor 1403.

Similarly, numeral 1404 includes the pixel sensors at the coordinate positions (0, 5), (1, 5), (2, 5), . . . (19, 5), and is referred to as a reading line sensor 1404 in the below description.

In the present embodiment, the reading unit 205 including the area sensor 213 in the reader is caused to drive in the arrow direction illustrated in FIG. 2 to read the original document image placed on the document table 204.

That is, the reading line sensors 1403 and 1404, i.e., the group of pixel sensors, are treated as the line sensor to perform the reading operation as described above.

Next, described is how the original document image read by the reading line sensors 1403 and the reading line sensor 1404 becomes.

In this description, FIG. 8 is the original document image to be read.

That is, this original document image corresponds to the original document image 203 in FIG. 2.

What is shown in a lattice in the figure corresponds to the resolution of the pixel sensors constituting the reading line sensor 1403 or 1404.

The original document image is read as shown in above-described (a) to (e) of FIG. 9 to (a) and (b) of FIG. 13, but the image data inclined at the angle θ are obtained because of the inclination θ.

For example, originally, if the area sensor were not inclined, a position shown by a shaded area in (a) of FIG. 15 would be read. However, due to the inclination of the area sensor, the line sensor 1403, 1404 detect image data as shown in (b) and (c) of FIG. 15.

Then, these image data are respectively memorized to memory media such as memories as shown in (d) and (e) of FIG. 15 while the image data are still inclined.

Similarly, a position shown by a shaded area in (a) of FIG. 16 is read while the sensor unit 205 moves and the light source moves. At this moment, the line sensors 1403, 1404 detect image data as shown in (b) and (c) of FIG. 16.

Then, these image data are respectively memorized to memory media such as memories as shown in (d) and (e) of FIG. 16.

In addition, a position shown by a shaded area in (a) of FIG. 17 is read while the reading unit moves in the secondary scan direction and the light source moves. At this moment, the line sensors 1403, 1404 detect image data as shown in (b) and (c) of FIG. 17.

Then, these image data are respectively memorized to memory media such as memories as shown in (d) and (e) of FIG. 17.

The image data eventually having been detected and read by the line sensors 1403, 1404 are data shown in (a) and (b) of FIG. 18, and either of the image data is read as image data inclined at the angle θ.

At this moment, a direction shown by arrow (A) in (a) and (b) of FIG. 18 is called the primary scan direction, and a direction shown by arrow (B) is called the secondary scan direction.

In contrast, a direction shown by arrow (C) is called a lateral direction of the read image data. On the other hand, a direction shown by arrow (D) is called a longitudinal direction of the read image data.

As shown in (a) of FIG. 14, the reading line sensor 1403 and the reading line sensor 1404 are physically shifted by an amount equivalent to one pixel sensor in the short-side direction.

Thus, the pixel sensors constituting the reading line sensor 1403 and the pixel sensors constituting the reading line sensor 1404 have a phase shift in the long-side direction.

For example, the position of the pixel sensor at a coordinate (x, y)=(15, 4) of the reading line sensor 1403 and the position of the pixel sensor at a coordinate (x, y)=(15, 5) of the reading line sensor 1404 are shifted in the y axis direction, i.e., the short-side direction, by an amount equivalent to y=1.

This shift brings about a shift equivalent to Δβ in the secondary scan direction.

On the other hand, the position in the x axis direction, i.e., the long-side direction, is completely the same, namely, x=15.

However, due to the inclination angle θ, the phase is shifted by a minute amount Δα within the subpixel in the horizontal direction of the reference arrangement position.

That is, a phase shift in minute units occurs by inclining the area sensor even in a case of the pixel sensor at the same position in the long-side direction, i.e., the x axis direction, of the reading line sensor. This phase shift relies on the inclination angle.

Thus, the image data read by the reading line sensor defined in the area sensor 213 becomes image data having phase shifts different for each line sensor.

Specifically, the phase of the read image data in (a) of FIG. 18 and the phase of the read image data in (b) of FIG. 18 are not only shifted by Δβ in the secondary scan direction but also shifted by Δα in the primary scan direction.

In the above-described description, it is assumed that there exist two reading line sensors (reading line sensors 1403, 1404). But it is not limited thereto.

It may also be possible to increase the pixel sensors constituting the area sensor 113 in the x axis direction, so that many area sensors are arranged.

That is, it may be possible to arrange as many reading area sensors as the number of pixels lining up in the x axis direction constituting the area sensor 213.

The number of the arranged reading line sensors is equal to the number of the image data obtained per one reading operation.

That is, if thirty lines of reading line sensors are arranged in the area sensor 213, thirty read images each having a unique phase shift can be obtained through one reading operation.

By inclining the area sensor, one scanning of the original document image allows obtaining multiple frame image data whose positional shift of the original document image read by the sensors adjacent to each other in the short-side direction is less than one pixel.

On the other hand, the sensors may be arranged as shown in (b) of FIG. 14.

The long-side direction is the same direction as a horizontal direction in the reference arrangement position. However, the short-side direction is inclined with respect to the reference arrangement position.

Also in this case, similar to (a) of FIG. 14, one scanning of the original document image allows obtaining the frame image data whose positional shift read by the sensors adjacent to each other in the short-side direction is less than one pixel in the primary scan direction and/or the secondary scan direction.

That is, in the area sensor including multiple sensors, any sensor will do as long as the sensor allows obtaining the frame image data whose positional shift read by the sensors adjacent to each other in the short-side direction is less than one pixel in the primary scan direction and/or the secondary scan direction when a scanning position moves parallel relative to the original document image.

On the other hand, both of the angles θ in (a) of FIG. 14 and the angle θ' in (b) of FIG. 14 will do as long as the angles are within a range capable of obtaining the frame image data whose positional shift read by the sensors adjacent to each other in the short-side direction through one scanning of the original document image is less than one pixel in the primary scan direction and/or the secondary scan direction.

Furthermore, the number of the frame image data obtained in the short-side direction of the sensor may be increased by increasing the number of times of readings in the secondary scan direction during reading of the original document image and by increasing the number of times of samplings per unit time.

<Detailed Description of Printer Image Processor 315>

Figure 6:
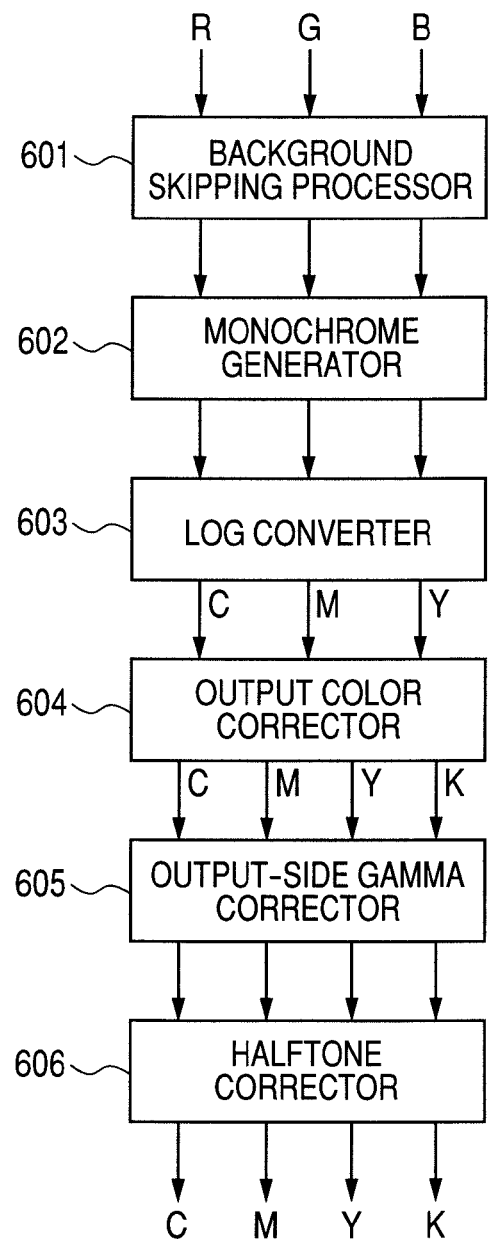
FIG. 6 is a block configuration diagram showing an internal structure of a printer image processor 215.

FIG. 6 shows an internal structure of the printer image processor 315.

A background skipping processor 601 uses the histogram generated by the scanner image processor 312 to skip (remove) a background color of the image data.

A monochrome generator 602 converts color data into monochrome data. A Log converter 603 performs a brightness density conversion. This Log converter 603 converts, for example, the RGB input image data into CMY image data.

An output color corrector 604 performs an output color correction. For example, the CMY input image data is converted into CMYK image data using a table and a matrix.

An output side gamma corrector 605 performs a correction so that a signal value input into this output side gamma corrector 605 becomes proportional to a reflection density value after copy and output.

A halftone corrector 606 performs a halftone processing according to the number of levels of halftone of the printer that outputs. For example, the halftone corrector 606 performs, on the received multilevel halftone image data, a conversion into binary and a conversion into 32-value.

It should be noted that each processor in the scanner image processor 312 and the printer image processor 315 can output the received image data without performing each processing. Causing a processor to allow data to pass therethrough without performing any processing in this way is hereinafter referred to as "pass through a processor".

<Processing Mode Setting of Super-resolution Processing>

A processing mode setting according to the present embodiment will be hereinafter described in detail using FIG. 19.

It should be noted that the area sensor shown in (a) of FIG. 14 is used in the present embodiment. The image processing apparatus is used that has the area sensor capable of obtaining 100 frames of low resolution frame image data equivalent to 100 dpi when the original document image is read. This image processing apparatus can generate a 200 dpi high resolution image from four frames of low resolution frame image data in the super-resolution processing.

Similarly, the image processing apparatus can generate a 300 dpi image from 10 frames of low resolution frame image data.

In addition, the image processing apparatus can generate a 600 dpi high resolution image from 40 frames of low resolution frame image data.

The image processing apparatus can generate a 1200 dpi high resolution image from 100 frames of low resolution frame image data.

It should be noted that the number of frames of low resolution image data needed for obtaining a desired resolution is not limited to the above-described number of frames of low resolution image data. For example, a 1000 dpi high resolution image may be generated from 50 frames, and a 500 dpi high resolution image may be formed from 50 frames.

This depends on a capability of the image processing apparatus.

On the other hand, not all obtained low resolution images can be used.

For example, an image whose shift of the reading pixel position of the frame image data read by the adjacent sensors, i.e., phase shift, is one pixel or more cannot be used for the super-resolution processing.

Such low resolution frame image data is not counted as the obtained low resolution frame image data.

FIG. 19 is a figure for describing an outline of operation performing a super-resolution processing-mode setting processing. A control program realizing the processing shown in FIG. 19 is contained in the ROM 303 as described above, and is executed by the CPU 301.

First, in step S1901, an instruction of an output mode is received from the user via a user interface (hereafter called "UI"). In response, the UI having received this instruction sends this instruction to the CPU 301 via the operation section I/F, and the CPU obtains the output mode.

Next, the CPU 301 obtains an output resolution that is set according to the output mode obtained in step S1902.

Next, in step S1903, the CPU 301 makes a determination as to whether the output resolution obtained in step S1902 is 200 dpi. In a case where the output resolution is set to 200 dpi, the CPU 301 sets the number of obtaining low resolution frame image data to four frames (step S1904).

Next, in step S1905, a document reading is performed with the scanner, so that four frames of low resolution frame image data are obtained.

Next, in step S1906, the image converter 317 corrects inclination of the low resolution frame image data obtained in step S1905.

At this moment, the inclination angle θ of the obtained frame image data is a value that can be obtained when the area sensor 213 is mounted on the reading unit 205 in an assembly step of the multifunction apparatus including this area sensor.

This inclination angle θ is held, as a value unique to the mounted apparatus, in a memory area in the multifunction apparatus.

An affine transformation is performed using the above-described angle information, so that the obtained, obliquely inclined frame image data is rotated. At this occasion, a rotation is made for an amount of inclination with respect to the reference arrangement position of the frame image data. Thereby, the inclination of the frame image data is corrected. Where a coordinate before the conversion is (x, y), a coordinate after the conversion is (X', Y'), and a rotation angle (in the present embodiment, the inclination angle of the area sensor) is θ, the frame image data whose inclination has been corrected can be obtained through the affine transformation processing as shown in Formula 1.

$$[X', Y'] = [X, Y] \begin{bmatrix} \cos\theta & \sin\theta \\ -\sin\theta & \cos\theta \end{bmatrix} \quad \text{(Formula 1)}$$

X', Y': Coordinate position after the conversion
X, Y: Coordinate position before the conversion The frame image data obtained through the above-described affine transformation becomes the low resolution frame image data whose inclination has been corrected.

It should be noted that the method for correcting the inclination is not limited to the affine transformation. Any method is applicable as long as the method can correct the inclination of the frame image data.

It should be noted that this processing is necessary in a case where the frame image data without any inclination can be obtained with the sensor capable of obtaining the frame image data whose shift of the position read by the sensors adjacent to each other in the short-side direction is less than one pixel in the primary scan direction and/or the secondary scan direction as shown in (b) of FIG. 14.

Then, in step S1913, the super-resolution processing is performed using the multiple frames of frame image data whose inclination has been corrected, and the processings are terminated.

The super-resolution processing performed at this occasion will be described in detail using FIGS. 20, 21.

FIG. 20 is a figure showing the low resolution image data used for the super-resolution processing and the image data after the super-resolution processing. FIG. 20 shows an original document and a reference low resolution image data F0 and target low resolution image data F1 to F3 obtained by reading the original document with the area sensor. A dashed rectangle enclosing the document denotes an area from which the area sensor reads the reference low resolution image data F0. A solid rectangle denotes an area from which the area sensor reads each of the target low resolution image data F1 to F3.

In the present embodiment, a shift amount in the primary scan direction is denoted as "um", and a shift amount in the secondary scan direction is denoted as "vm". These shift amounts regarding the target low resolution image data Fn (n=1 to 3) are denoted as "umn", "vmn". For example, as shown in FIG. 20, the target low resolution image data F1 is shifted in the secondary scan direction with respect to the target low resolution image data F0, and the shift amounts thereof are denoted as um1, vm1.

Similarly, the shift amounts of the target low resolution image data F2, F3 are denoted as um2, vm2 and um3, vm3.

The shift amounts umn, vmn regarding each of the target low resolution image data Fn (n=1 to 3) are calculated based on the image data of the reference low resolution image data F0 and the image data of the target low resolution image data F1 to F3. The calculation employs a predetermined calculation method based on the inclination information of the area sensor previously memorized in the ROM 303.

In FIG. 20, the shift of each target low resolution image data is assumed to be in unit of one pixel and is shown accordingly in schematic form.

However, a phase shift of less than one pixel in the primary scan direction and the secondary scan direction occurs during the reading performed by the area sensor according to the present embodiment. The use of this minute shift enables the image to be made into high resolution.

Thus, among each pixel constituting a super-resolution processing image to be generated (hereinafter referred to as "a generated pixel"), there exist pixels that exist in neither of the reference low resolution image data nor the target low resolution image data.

Such pixels are made into high resolution while performing a combining by performing a predetermined interpolation processing using pixel data representing pixel values of pixels existing around the generated pixel. The usable interpolation processing includes a bi-linear method, a bi-cubic method, a nearest neighbor method.

For example, the interpolation processing through the bi-linear method will be described using FIG. 21. First, a nearest pixel 1802 located at the nearest distance from the position of a generated pixel 1801 is extracted from the reference low resolution image data and the target low resolution image data. Then, in the target low resolution image data in FIG. 21, four pixels surrounding the generated pixel position are determined as surrounding pixels 1802 to 1805, and data values of the surrounding pixels added with predetermined weights are averaged to obtain data value of the generated pixel from the following formula.

$f(x,y)=[|x1-x|\{|y1-y|f(x0,y0)+|y-y0|f(x0,y1)\}+|x-x0|\{|y1-y|f(x,y0)+|y-y0|f(x1,y1)\}]/|x1-x0||y1-y0|$

For example, a super-resolution image of twice as high resolution can be obtained as shown in FIG. 20 by repeating the above-described processing for each generated position. It should be noted that the resolution is not limited to twice, but can be various magnification ratios. In addition, it should be noted that the more data values of the multiple low resolution image data are used for the interpolation processing, the more precise super-resolution image can be obtained.

On the other hand, in a case where it is determined in step S1903 that the output resolution obtained in step S1902 is not 200 dpi, the CPU 301 makes a determination as to whether the output resolution is 300 dpi (step S1907). In a case where the output resolution is set to 300 dpi in step S1907, the CPU 301 sets the number of obtaining frames of low resolution data to ten frames (step S1908) and proceeds to S1905.

On the other hand, in a case where it is determined in step S1907 that the output resolution obtained in step S1902 is not 300 dpi, the CPU 301 makes a determination as to whether the output resolution is 600 dpi (step S1909). In a case where the output resolution is set to 600 dpi in step S1909, the CPU 301 sets the number of obtaining frames of the low resolution image data to forty frames (step S1910) and proceeds to S1905.

On the other hand, in a case where it is determined in step S1909 that the output resolution obtained in step S1902 is not 600 dpi, the CPU 301 makes a determination as to whether the output resolution is 1200 dpi (step S1911). In a case where the output resolution is set to 1200 dpi in step S1911, the CPU 301 sets the number of the obtaining frames of the low resolution image data to 100 frames (step S1912) and proceeds to S1905.

On the other hand, in a case where it is determined in step S1911 that the output resolution obtained in step S1902 is not 1200 dpi, the CPU 301 determines that the output mode is invalid and proceeds to step S1901.

<Output Mode Acquisition Processing>

The output mode acquisition processing described in step S1901 in FIG. 19 will be described in detail. In the present embodiment, the output resolution is determined by obtaining a scan resolution.

FIG. 22 is a figure for describing an outline of operation performing the output mode acquisition processing. The control program realizing the processings as shown in FIG. 22 is stored in the ROM 303 as described above, and is executed by the CPU 301.

First, in step S2201, the user designates the scan resolution via the operation section 13 serving as the UI, and the operation section 13 having received this designation sends this designation to the CPU 301 via the operation section I/F.

Then, in step S2202, the CPU 301 designated with this scan resolution sets this scan resolution as the output resolution and terminates the processing.

FIG. 23 is a schematic diagram showing an example of the operation section for setting the scan resolution, and the user can make settings with a scan resolution setting menu 2301 using this.

In the present embodiment, the scan resolution is designated, but the output resolution may also be determined by previously setting the maximum resolution of the apparatus.

<Document Reading Processing>

The document reading processing described in step S1905 in FIG. 19 will be described in detail. In the present embodiment, the number of frames of the obtaining frame image data is determined by controlling an effective area of the area sensor.

FIG. 24 is a figure showing the area sensor in the scanner 11 used in the present embodiment.

The area sensor shown as numeral 2401 is divided in the short-side direction into 100 pieces, and one divided piece is made one band and is controlled to perform reading as one line sensor.

In unit of this band, as many as 100 frames of 100 dpi frame image data can be obtained.

Thus, in a case of step S1904 in FIG. 19, as shown by numeral 2402, the frame image data is incorporated using bands 0 to 3 as an actual input image data reading area. Band 4 and subsequent bands are masked. Similarly, in a case of step S1908 in FIG. 19, as shown by numeral 2403, bands 0 to 9 are made the actual input image data reading area. Bands 10 and subsequent bands are masked. In a case of step S1910 in FIG. 19, as shown by numeral 2404, bands 0 to 39 are made the actual input image data reading area. Band 40 and subsequent bands are masked. In a case of step S1912 in FIG. 19, the frame image data is incorporated using all the bands (2405) as the actual input image data reading area. As a result of operation as described above, the number of frames of obtaining frame image data can be determined.

In this way, the number of frames of the obtaining frame image data can be controlled according to the output resolution, and the angle correction of the inclined image data can be performed using as many image data as the number of obtained frames (S1906).

Then, using those frame image data, the super-resolution conversion is performed (S1913).

It should be noted that in a case where non-inclined frame image data can be read as described above in S1905, it is not necessary to perform the angle correction processing in S1906.

As a result of the processings as described above, the number of frames of low resolution frame image data needed for the super-resolution processing can be set according to the set scan resolution, and high resolution image data can be obtained by performing the above-described super-resolution processing using the obtained frame image data.

In addition, the number of frames of necessary low resolution frame image data is controlled based on the resolution needed during the output. Thus, data amounts can be reduced during reading.

In addition, the number of frames of low resolution frame images obtained during reading is previously limited. Accordingly, a calculation amount of the super-resolution processing can also be reduced.

Second Embodiment

In the first embodiment, the output resolution is determined by obtaining the scan resolution. The present embodiment describes a case where the output resolution is determined by designating the copy mode.

The same processings as the first embodiment will be illustrated with the same reference numerals, and the outline description thereabout will be omitted.

The present embodiment describes four modes as copy modes, namely, a photographic paper photograph mode, a character mode, a character/photograph/map mode, and a printed photograph mode.

In the photographic paper photograph mode, halftone performance is regarded as important, and a setting is made to output at the resolution of 300 dpi.

Similarly, in the character mode, the resolution is regarded as important, and a setting is made to output at the resolution of 1200 dpi.

In the other modes, both of the halftone performance and the resolution are mutually satisfied, and a setting is made to output at the resolution of 600 dpi.

The relationship between the copy mode and the output resolution can be arbitrarily set.

FIG. 25 is a figure for describing an outline of operation performing the output mode acquisition described in step S1901 in FIG. 19. The control program realizing the processing shown in FIG. 25 is contained in the ROM 303 as described above, and is executed by the CPU 301.

First, in step S2501, the copy mode designated with the operation section 13 is obtained. Next, in step S2502, a determination is made as to whether the obtained copy mode is the photographic paper photograph mode. In a case where it is determined that the obtained copy mode is the photographic paper photograph mode, the output resolution is set to 300 dpi (step S2503), and the processings are terminated.

On the other hand, in a case where it is determined in step S2502 that the obtained copy mode is not the photographic paper photograph mode, a determination is made as to whether the copy mode obtained in step S2502 is the character mode (step S2504). In a case where it is determined in step S2504 that the obtained copy mode is the character mode, the output resolution is set to 1200 dpi (step S2505), and the processings are terminated.

On the other hand, in a case where it is determined in step S2504 that the obtained copy mode is not the character mode, a determination is made as to whether the copy mode obtained in step S2502 is the character/photograph/map mode or the printed photograph mode (step S2506). In a case where it is determined in step S2506 that the obtained copy mode is the character/photograph/map mode or the printed photograph mode, the output resolution is set to 600 dpi (step S2507), and the processings are terminated.

On the other hand, in a case where it is determined in step S2506 that the obtained copy mode is not the character/photograph/map mode or the printed photograph mode, the processing returns back to step S2501.

FIG. 26 is a schematic diagram showing an example of the operation section for setting the copy mode, and the settings can be made with a copy mode setting menu 2601.

As a result of the processings as described above, the number of frames of low resolution frame image data needed for the super-resolution processing is set according to the set scan resolution, and the above-described super-resolution processing is performed using the obtained frame image data. Thus, high resolution image data can be obtained.

In addition, the number of frames of necessary low resolution frame image data is controlled based on the resolution needed during the output. Thus, data amounts can be reduced during reading.

In addition, the number of frames of low resolution frame image data obtained during reading is previously limited. Accordingly, a calculation amount of the super-resolution processing can also be reduced.

As a result of the processings as described above, the number of frames of low resolution frame image needed for the super-resolution processing is set according to the set copy mode, and the above-described super-resolution processing is performed using the obtained frame image data. Thus, high resolution image data can be obtained.

In addition, the number of necessary low resolution image data is controlled based on the resolution needed during the output. Thus, data amounts handled during reading can be reduced.

In addition, the number of frames of low resolution frame image data obtained during reading is previously limited. Accordingly, a calculation amount of the super-resolution processing can also be reduced.

Third Embodiment

In the present embodiment, a case will be described where the output resolution is determined according to an enlargement ratio and a reduction ratio of the document.

It should be noted that the same processings as the first embodiment will be illustrated with the same reference numerals, and the outline description thereabout will be omitted.

In the present embodiment, an enlargement ratio of 141% for performing an enlargement printing upon enlarging A4 document into A3 document is used as a reference, and a jaggy in an enlargement processing is reduced by setting the output resolution in such occasion to twice as much as the scan resolution.

On the other hand, a reduction ratio of 70% for performing a reduction printing upon reducing A3 document into A4 document is used as a reference, and a calculation amount in a reduction processing is reduced by setting the output resolution in such occasion to half of the scan resolution.

In the present embodiment, each output resolution is fixedly set. But needless to say, each output resolution may be arbitrarily set according to each enlargement and reduction ratio.

FIG. 27 is a figure for describing an outline of operation performing the output mode acquisition described in step S1901 in FIG. 19. The control program realizing the processing as shown in FIG. 27 is contained in the ROM 303 as described above, and is executed by the CPU 301.

First, in step S2701, an enlargement reduction ratio X designated by the operation section 13 is obtained. Next, the scan resolution is obtained in step S2702. Next, a determination is made as to whether the enlargement reduction ratio X obtained in step S2701 is between 100% and 141% (step S2703). In a case where it is determined in step S2703 that the enlargement reduction ratio X is between 100% and 141%, the output resolution is set to twice as much as the scan resolution.

For example, in a case where the scan resolution is 300 dpi, the output resolution becomes 600 dpi (step S2704).

When the output resolution becomes known as described above, processings after this are performed according to the flow shown in FIG. 19. Thus, in a case where the output resolution is set to 600 dpi, the processing proceeds from S1909 to S1910, and the number of frames of necessary frame image data becomes 40 frames.

Thereafter, the processing proceeds to S1905, and the original document image is read. In S1906, 1913, the super-resolution processing, namely, image correction and high resolution processing, is performed.

On the other hand, in a case where it is determined in step S2703 that the enlargement reduction ratio X is not between 100% and 141%, a determination is subsequently made as to whether the enlargement reduction ratio X is between 70% and 100% (step S2705). In a case where it is determined in step S2705 that the enlargement reduction ratio X is between 70% and 100%, the output resolution is set to one-half of the scan resolution. For example, if the scan resolution is 600 dpi, the output resolution becomes 300 dpi (step S2706).

In this way, when the output resolution becomes known, the processings subsequent to this are performed according to the flow shown in FIG. 19. Thus, in a case where the output resolution is set to 300 dpi, the processing proceeds from S1907 to S1908, and the number of frames of necessary frame image data becomes 10 frames.

Thereafter, the processing proceeds to S1905, and the original document image is read. In S1906, 1913, the super-resolution processing, namely, image correction and high resolution processing, is performed.

FIG. 28 is a schematic diagram showing an example of the operation section for setting the copy mode, and the user can make settings with a magnification ratio setting menu 2801.

As a result of the processings as described above, the number of frames of low resolution frame image data needed for the super-resolution processing is set according to the set enlargement reduction ratio, i.e., a scaling ratio during the output, and the above-described super-resolution processing is performed using the obtained frame image data. Thus, high resolution image data can be obtained.

In addition, the number of frames of necessary low resolution frame image data is controlled based on the resolution needed during the output. Thus, data amounts handled during reading can be reduced.

In addition, the number of frames of low resolution frame image data obtained during reading is previously limited. Accordingly, a calculation amount of the super-resolution processing can also be reduced.

Fourth Embodiment

In the present embodiment, a case will be described where the output resolution is determined according to an output layout of the original document.

The same processings as the first embodiment will be illustrated with the same reference numerals, and the outline description thereabout will be omitted.

In the present embodiment, a reduction layout is set to 300 dpi in a case of 2 in 1 (two pages of the document is realized in one page), and the reduction layout is set to 200 dpi in a case of 4 in 1 (four pages of the document is realized in one page). Thus, the smaller an area of one page becomes, the lower the output resolution is set to.

FIG. 29 is a figure for describing an outline of operation performing the output mode acquisition described in step S1901 in FIG. 19. The control program realizing the processing shown in FIG. 29 is contained in the ROM 303 as described above, and is executed by the CPU 301.

First, in step S2901, layout information representing a layout setting value designated by the operation section 13 is obtained. Next, a determination is made as to whether the layout setting value obtained in step S2901 is 2 in 1 (step S2902). In a case where it is determined in step S2902 that the layout setting value is 2 in 1, the output resolution is set to 300 dpi (step S2903), and the processings are terminated.

On the other hand, in a case where it is determined in step S2902 that the layout setting value is not 2 in 1, a determination is subsequently made as to whether the layout setting value is 4 in 1 (step S2904). In a case where it is determined in step S2904 that the layout setting value is 4 in 1, the output resolution is set to 200 dpi (step S2905), and the processings are terminated.

FIG. 30 is a schematic diagram showing an example of the operation section for setting the reduction layout, and the user can make settings with a reduction layout setting menu 3001.

As a result of the processings as described above, the number of frames of low resolution frame image data needed for the super-resolution processing is set according to the set output layout, and the above-described super-resolution processing is performed using the obtained frame image data. Thus, data amounts can be reduced during reading capable of obtaining high resolution image data.

In addition, the number of necessary low resolution frame image data is controlled based on the resolution needed during the output. Thus, data amounts handled during reading can be reduced.

In addition, the number of frames of low resolution frame image data obtained during reading is previously limited. Accordingly, a calculation amount of the super-resolution processing can also be reduced.

Fifth Embodiment

In the first to fourth embodiments, during the document reading processing, the area sensor is divided at the constant band width, and a limitation is applied in units of bands, so that the effective area is controlled. In the present embodiment, the output resolution controls the band width of the area sensor, so that the number of obtained frames of low resolution frame image data is determined.

FIG. 31 is a figure showing the area sensor in the scanner 11 used in the present embodiment.

The area sensor as shown by numeral 3101 is arbitrarily divided in the short-side direction, and multiple line sensors are bundled to be treated as one line sensor and controlled to perform reading.

Thus, in a case of step S1904 in FIG. 19, as illustrated by numeral 3102, the area sensor is divided into four bands, and the image data are incorporated as bands 0 to 3. Similarly, in a case of step S1908 in FIG. 19, the frame image data is incorporated as bands 0 to 9 as shown by numeral 3103.

In a case of step S1910 in FIG. 19, the frame image data is incorporated as bands 0 to 39 as shown by numeral 3104.

In a case of step S1912 in FIG. 19, the image data is incorporated as all bands (3105). As a result of the operations as described above, the number of frames of obtaining frame image data can be determined.

In this way, the area of the area sensor is divided into the number of frames of obtaining frame image data.

As a result of the processings as described above, the number of frames of low resolution frame image data needed for the super-resolution processing is set according to the set scan resolution or the set output resolution, and the entire area sensor can be effectively utilized. In addition, the number of frames of low resolution frame image data obtained during reading is previously limited. Accordingly, a calculation amount of the super-resolution processing can also be reduced.

In addition, as described above, the number of times of reading in the secondary scan direction is increased during the original document image reading, and the number of times of sampling per unit time is increased. Thus, the number of obtained frame image data obtained in the short-side direction of the sensor can be increased.

Thus, by controlling the timing of sampling, the number of obtained frame image data obtained in the short-side direction of the sensor can be controlled.

Other Embodiments

Furthermore, the present embodiment can be applied to a system including multiple appliances (for example, computer, interface appliance, reader, printer, and the like) and can be applied to an apparatus including a single appliance (image processing apparatus, printer, facsimile apparatus, and the like).

The object of the present invention may also be accomplished by causing a computer (or a CPU and an MPU) in a system or an apparatus to read out and execute a program code in a memory medium memorized with the program code realizing a procedure of the flowcharts described in the above-described embodiments. In this case, the program code itself read from the memory medium realizes the functions of the above-described embodiments. Hence, the program code and the memory medium in which the program code is memorized constitute the present invention.

Examples of the memory medium for supplying the program code include a floppy (registered trademark) disk, a hard disk, an optical disk, a magnetic-optical disk, a CD-ROM, a CD-R, a magnetic tape, a nonvolatile memory card, a ROM, and the like.

Further, the program code read out by the computer can also be executed. The present invention may also include a case where the functions of the above described embodiments are accomplished by causing an OS (operating system) or the like running on the computer to perform a part or all of the actual processings based on instructions of the program code.

Further, a program code read out from the memory medium may be written to a memory provided on an expansion board inserted into a computer or in an expansion unit connected to the computer. In such occasion, a CPU or the like provided in the expansion board or the expansion unit performs a part or all of the actual processings based on instructions of the program code, and these processings realize the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2007-330976, filed Dec. 21, 2007, and No. 2008-317281, filed Dec. 12, 2008, which are hereby incorporated by reference herein in their entirety.

The invention claimed is:

1. An image processing apparatus, comprising:
an area sensor unit configured to read from an original document image a plurality of frames of image data having a shift of less than one pixel;
an output resolution acquisition unit configured to obtain an output image resolution at which the original document image read by the area sensor unit is output;
an acquisition frame number control unit configured to control a number of frames read by the area sensor unit according to a result of the output resolution acquisition unit;
a correction unit configured to correct an inclination of the frames of image data controlled by the acquisition frame number control unit; and
a high resolution conversion unit configured to perform interpolation processing using the plurality of frames of image data whose inclination is corrected by the correction unit to obtain image data in a resolution higher than a resolution during reading,
wherein the output resolution acquisition unit determines the output image resolution according to a type of the original document image.

2. An image processing method carried out in an image processing apparatus having an area sensor unit that reads from an original document image a plurality of frames of image data having a shift of less than one pixel, the image processing method comprising:
obtaining an output resolution at which the original document image read by the area sensor unit is output;
controlling a number of frames read by the area sensor unit according to a result of the obtaining step;
correcting an inclination of the frames of image data controlled in the controlling step; and
performing interpolation processing using the plurality of frames of image data whose inclination is corrected in the correcting step to obtain image data in a resolution higher than a resolution during reading,
wherein, in the obtaining step, the output image resolution is determined according to a type of the original document image.

3. An image processing apparatus, comprising:
an area sensor unit arranged with a first sensor and a second sensor adjacent to the first sensor, the first sensor and the second sensor being arranged in such a manner that a reading position of an original document image is shifted by less than one pixel between the first sensor and the second sensor among a plurality of sensors;
an output resolution acquisition unit configured to obtain an output image resolution at which the original document image read by the area sensor unit is output;
an acquisition frame number control unit configured to control a number of frames of image data read by the area sensor unit according to a result of the output resolution acquisition unit; and
a high resolution conversion unit configured to perform interpolation processing using the frames of image data controlled by the acquisition frame number control unit to obtain image data in a resolution higher than a resolution during reading,
wherein the output resolution acquisition unit determines the output image resolution according to a type of the original document image.

4. An image processing method carried out in an image processing apparatus having an area sensor unit arranged with a first sensor and a second sensor adjacent to the first sensor, the first sensor and the second sensor being arranged in such a manner that a reading position of an original document image is shifted by less than one pixel between the first sensor and the second sensor among a plurality of sensors, the image processing method comprising:
obtaining an output image resolution at which the original document image read by the area sensor unit is output;
controlling a number of frames of image data read by the area sensor unit according to a result of the obtaining step; and
performing interpolation processing using the frames of image data controlled in the controlling step to obtain image data in a resolution higher than a resolution during reading,
wherein, in the obtaining step, the output image resolution is determined according to a type of the original document image.

5. A non-transitory computer-readable memory medium for storing a program that, when executed by a processor, causes an image processing apparatus having an area sensor unit that reads from an original document image a plurality of frames of image data having a shift of less than one pixel to execute an image processing method comprising:
obtaining an output image resolution at which the original document image read by the area sensor unit is output;
controlling a number of frames read by the area sensor unit according to a result of the obtaining step;
correcting an inclination of the frames of image data controlled in the controlling step; and
performing interpolation processing using the plurality of frames image data whose inclination is corrected in the correcting step to obtain image data in a resolution higher than a resolution during reading,
wherein, in the obtaining step, the output image resolution is determined according to a type of the original document image.

* * * * *